(12) United States Patent
Loce et al.

(10) Patent No.: US 6,356,654 B1
(45) Date of Patent: Mar. 12, 2002

(54) SYSTEMS AND METHODS FOR TEMPLATE MATCHING OF MULTICOLORED IMAGES

(75) Inventors: Robert P. Loce, Webster; Michael S. Cianciosi, Rochester; Ying-Wei Lin, Penfield, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/219,705

(22) Filed: Dec. 23, 1998

(51) Int. Cl.[7] .................................................. G06K 9/00
(52) U.S. Cl. ........................................ 382/162; 382/209
(58) Field of Search ................................. 382/161, 162, 382/163, 164, 165, 166, 167, 209; 358/515, 518, 520, 535, 536, 298, 448, 296, 447; 395/102, 115, 116

(56) References Cited

U.S. PATENT DOCUMENTS

| | | | |
|---|---|---|---|
| 4,437,122 A | 3/1984 | Walsh et al. | |
| 4,630,125 A | 12/1986 | Roetling | |
| 4,847,641 A | 7/1989 | Tung | |
| 4,933,689 A | 6/1990 | Yoknis | |
| 5,005,139 A | 4/1991 | Tung | |
| 5,027,078 A | 6/1991 | Fan | |
| 5,226,094 A | 7/1993 | Eschbach | |
| 5,237,646 A | 8/1993 | Bunce | |
| 5,274,472 A | 12/1993 | Williams | |
| 5,325,216 A | 6/1994 | Auyeung | |
| 5,353,127 A | 10/1994 | Shiau et al. | |
| 5,383,036 A | 1/1995 | Mailloux et al. | |
| 5,383,086 A | 1/1995 | Wietelmann et al. | |
| 5,387,985 A | 2/1995 | Loce et al. | |
| 5,506,699 A | 4/1996 | Wong | |
| 5,521,989 A | 5/1996 | Fan | |
| 5,528,384 A | 6/1996 | Metcalfe et al. | |
| 5,579,445 A | 11/1996 | Loce et al. | |
| 5,581,292 A | 12/1996 | Cianciosi et al. | |
| 5,594,809 A | * 1/1997 | Kopec et al. | 382/161 |
| 5,659,634 A | 8/1997 | Yeh et al. | |
| 5,666,470 A | 9/1997 | Parker | |
| 5,687,297 A | * 11/1997 | Coonan et al. | 395/102 |
| 5,689,343 A | * 11/1997 | Loce et al. | 358/298 |
| 5,696,845 A | 12/1997 | Loce et al. | |
| 5,742,703 A | 4/1998 | Lin et al. | |
| 5,764,795 A | * 6/1998 | Takeo et al. | 382/167 |
| 5,768,432 A | 6/1998 | Schweid | |
| 5,809,177 A | 9/1998 | Metcalfe et al. | |
| 5,822,451 A | * 10/1998 | Spaulding et al. | 382/162 |
| 6,091,849 A | * 7/2000 | Spaulding et al. | 382/162 |
| 6,104,829 A | * 8/2000 | Nakajima | 382/167 |

FOREIGN PATENT DOCUMENTS

| | | |
|---|---|---|
| EP | 0 768 792 A | 4/1997 |
| EP | 0 854 636 A | 7/1998 |

OTHER PUBLICATIONS

M. Analoui et al., "New Results on Reconstruction of Continuous–Tone from Halftone", Proceedings ICASSP (International Conference on Acoustics, Speech and Signal Processing), pp. 313–316, 1992.

(List continued on next page.)

Primary Examiner—Phuoc Tran
Assistant Examiner—Amir Alavi
(74) Attorney, Agent, or Firm—Oliff & Berridge, PLC

(57) ABSTRACT

Systems and methods for template matching of multicolored images provide an image conversion process that respectively views two, three or four input color planes through an input observation window. Single plane vectors are obtained that represent the color planes. The obtained single plane vectors are combined into a multi-plane vector that may be used in a look-up table for descreening or resolution enhancement, for example. Various interactions between color planes may be taken into account to provide optimum color space conversion. Additional information obtained by using the multi-plane vector allow performance of image processes with optimized accurate color values.

35 Claims, 15 Drawing Sheets

OTHER PUBLICATIONS

Z. Fan, "Retrieval of Images from Digital Halftones," Proceedings of the International Symposium on Circuits and Systems, pp. 2477–2480, 1992.

S. Floyd et al., "An Adaptive Algorithm for Spatial Grayscale", SID (Society for Information Display), pp. 75–77, vol. 17 No. 2 Second Quarter, 1976.

S. Hein et al., "Reconstruction of Continuous Tone Images from Their Error–Diffused Versions", Proceedings of the Conference on Human Vision, Visual Processing and Digital Display IV, pp. 310–324, (SPIE) vol. 1913, 1993.

C. Miceli et al., "Inverse Halftoning", Journal of Electronic Imaging, pp. 143–151, vol. 1(2), Apr. 1992.

A. N. Netravali et al., "Display of Dithered Images", SID (Society for Information Display) 1980 International Symposium, pp. 185–190, vol. 22 No. 3, 1981.

S. M. Schweisser, "A Bayseian Approach to Inverse Halftoning", Proceedings of the Conference on Human Vision, Visual Processing, and Digital Display IV, pp. 282–292, vol. 1913, Feb. 1993.

M. Y. Ting, "Error–Diffused Image Compression Using a Binary–to–Gray–Scale Decoder and Predictive Pruned Tree– Structured Vector Quantization", IEEE Transactions on Image Processing, vol. 3, No. 6, pp. 854–858, Nov. 1994.

Robert P. Loce et al., "Optimal Morphological Restoration: The Morphological Filter Mean–Absolute–Error Theorem," Journal of Visual Communication and Image Representation, vol. 3, No. 4, pp. 412–432 (12/92).

E.R. Dougherty et al., "Optimal Mean–Absolute–Error Hit–or–Miss Filters: Morphological Representation and Estimation of the Binary Conditional Expectation," SPIE Journal of Optical Engineering, vol. 32, No. 4, pp. 815–827, Apr. 1993.

Paul G. Roetling et al., "Digital Image Processing Methods: Digital Halftoning (10)", Marcel Dekker, Inc. pp. 363–413 (1994).

Robert P. Loce, et al., "Enhancement and Restoration of Digital Documents: Statistical Design of Nonlinear Algorithms", SPIE—The International Society for Optical Engineering, pp. 1–50 and 102–125 (1997).

Becky Colgan ed., Behind Hewlett–Packard's Patent on Resolution Enhancement™ technology, Torry Pines Reaearch, BIS CAP International, 1990, pp. 1–60.

Robert P. Loce et al. ; Facilitation of Optimal Binary Morphological Filter Design via Structuring Element Libraries and Design Constraints, Optical Engineering, vol. 31, No. 5, May 1992, pp. 1008–1025.

Edward R. Dougherty ed., Marcel Dekker; Mathematical Morphology in Image Processing, pp. 43–90 (1992).

Robert P. Loce and Edward R. Dougherty; Spatial Resolution Conversion Using Paired Increasing Operators, Enhancement and Restoration of Digital Document, pp. 202–210, SPIE Optical Engineering, Press, 1997.

David R. Cok; Reconstruction of CCD Images Using Template Matching, IS&T's $47^{th}$ Annual Conference/ICPS 1994, pp. 380–385.

Edward R. Dougherty et al.; Optimal binary differencing filters: design, logic complexity, precision analysis, and application to digital document processing, Journal of Electronic Imaging, Jan. 1996, vol. 5, NO. 1, pp. 66–86.

John C. Dougherty et al.; Model–based optical restoration of fax images in the context of mathematical morphology, Journal of Electronic Imaging, Apr. 1994, vol. 3, No. 2, pp. 182–189.

* cited by examiner

3x3
CENTER (1,1)

3x3
CENTER (1,0)

3x3
CENTER (1,0) WITHOUT CORNER

SYSTEMS AND METHODS FOR TEMPLATE MATCHING OF MULTICOLORED IMAGES

BACKGROUND OF THE INVENTION

1. Field of Invention

This invention relates to systems and methods for template matching of color images. More specifically, this invention relates to systems and methods for template matching for both continuous multi-plane color images and binary multi-plane color images for various applications.

2. Description of Related Art

A wide variety of digital document processing tasks are performed using template-based filters. Illustratively, digital document processing tasks include resolution conversion, restoration, appearance tuning and descreening of images. These tasks are commonly performed on monochrome and color images. The color images may be composed of multiple color-space planes, or color separation layers.

In conventional systems and methods, a typical template operator is provided to perform binary filtering of both monochrome and color images. The template operator observes an arrangement of pixel values using a suitable window. The template operator then vectorizes the binary pixel values observed in the window. As a result, a vector is obtained that represents the observed binary pixels. The vector is then used as a pointer to a look-up table. As a result, the look-up table generates an appropriate output.

In particular, various descreening methods have been devised for monochrome half-toned images, such as the method for descreening error diffused halftoned images described in M.Y. Ting et al., "Error Diffused Image Compression Using a Halftone-to-Grayscale Decoder and Predictive Pruned Tree-Structured Vector Quantization." IEEE Transactions on Image Processing, 3(6): 854–858, November 1994.

Illustratively, a 3×3 window may be used to process a monochrome image. The 3×3 window, at some location in a monochrome image, observes a block of binary-valued pixels. The 3×3 window vectorizes the block of binary valued pixels.

The vector is expressed in the form $(a_1\ a_2\ \ldots\ a_9)$. The vector is then used in the look-up table. Specifically, the vector may be input into a look-up table, the look-up table associates the input vector with some desired value, and then that desired value is output from the look-up table.

Alternatively, it may be desirable or necessary to descreen a cyan, magenta, yellow and black (CMYK) half-toned, device-dependent bitmap and convert it to device-independent space, for example. A conventional template operator may be used to process the full color CMYK image. Such a template operator for color images may also include a 3×3 window. The 3×3 window is conventionally used in an independent manner and utilizes four nine-pixel vectors ($c_1$ $c_2 \ldots c_9$), ($m_1$ $m_2 \ldots m_9$), ($y_1$ $y_2 \ldots y_9$), and ($k_1$ $k_2 \ldots k_9$).

U.S. Pat. No. 5,758,034 discloses an example of a method that processes color planes with templates in an independent manner. U.S. Pat. No. 5,758,034 describes vectors are used to index four look-up tables. Alternatively, in some applications, one look-up table may be indexed four times. This process results in generation of independent output values for each plane.

The look-up table is conventionally created using a training image or a set of training images. The book *Restoration and Enhancement of Digital Documents* by R. Loce and E. Dougherty teaches methods of designing templates based on training sets of images. The training image will occur in pairs. A pair of training images may include two members where one member is a "typically observed image" and the other is the "ideal image." The training image pairs are input into a computer program that acquires and analyzes pattern statistics between the two images.

Illustratively, one member of a set of training images is a binary half-toned image, while the other member is the original grayscale image prior to halftoning. In this case the "observed image" is the halftoned image, and the ideal output of a descreening filter would be the gray-scale image prior to halftoning. The conversion from a binary image to a grayscale image is typically referred to as a descreening process. For a given pattern that occurs in the binary image about a target pixel, a training analysis examines a target pixel at that corresponding location in the gray-scale image. The center of the window may be placed at the target, for example. Based on the set of gray pixels associated with different locations of the same binary pattern, a "best gray pixel value" is determined for the pixel at the center or "origin" of the given template, i.e., the target pixel. This analysis is performed for all binary patterns are understood to be significant, where significance may be due to its frequency of occurrence or its effect on the filtered image. Accordingly, if a certain template is observed and considered significant, the target pixel will be assigned a certain value. Thus, design of filters for processing color images can be performed using statistical optimization techniques or expert knowledge.

An alternative approach that is equivalent to using a look-up table representation is the Boolean logic representation. In the Boolean logic representation, pixel values are used as variables in a logic architecture, such as a logical sum of products. The goal of template filter design when using Boolean logic representation is to derive statistically optimized Boolean operators. In conventional systems and methods, the Boolean operators are optimized and employed on the color planes independently.

SUMMARY OF THE INVENTION

Accordingly, when tasks such as resolution conversion, restoration, appearance tuning and descreening are performed on monochrome or color images, a filter is often applied independently to each color plane. A filter may be characterized as an operator or device that transforms one image, i.e., a binary image, into another image, i.e., a grayscale image. As a result, each color plane is treated independently. However, the treatment of each color plane independently is often inappropriate. In particular, the conventional approach is inconsistent with the simultaneous use, e.g., viewing, of the resultant color planes.

Furthermore, in conventional methods, each template-based filter for a given color plane is usually designed without consideration for adverse plane-to-plane interactions. Such adverse plane-to-plane interactions might occur when trying to enhance edges of black text within a cyan field. Independent treatment of the color planes in this case can result in image artifacts, such as a white gap between the black and cyan regions. Other template-filter applications with independent treatment can exhibit different anomalies or overall sub-optimal performance.

Further, the conventional methods to perform independent descreening also have various problems. Specifically, conventional independent descreening does not use all the information that is available. As a result, a generated image is not as refined as it could be if more of the available information were used. Also, independently descreening the color planes does not enable spatial structural information to be used in subsequent color transformations.

Conventional techniques using image enhancement through template matching by independent processing the color planes results in deficiencies in the generated image. The deficiencies may include white gaps at the border of the color planes of the image, for example. It is known to generate color edges that overlap a small amount so that a misregistration in the printing process does not cause a white gap between the colors at one edge. This intentional overlap is referred to as "trapping." However, the conventional methods and techniques simply do not provide optimized use of template based filters when processing multicolored images. In particular, the conventional methods and techniques do not provide optimized use of template based filters when performing a descreening process on a multi-colored image.

Accordingly, this invention provides systems and methods that input multi-plane images and obtain associated vectors jointly across several planes instead of a single plane.

This invention separately provides systems and methods for simultaneous template matching across color planes.

This invention separately provides systems and methods that optimize the logic of template matching by using a joint multi-plane vector instead of a single plane vector.

This invention separately provides systems and methods that input a multi-plane vector from a given location within an input image and simultaneously generates an output for all color planes for the given image location using a jointly optimized look-up table.

This invention separately provides improved systems and methods that treat edges within two color planes in a compatible manner in a template matching process.

This invention separately provides systems and methods that use the color setting of the local structural information to perform optimized color space conversions.

This invention separately provides systems and for descreening a single color plane.

According to one embodiment of the systems and methods according to this invention, a descreening and color conversion technique is provided that respectively views one, two, three or four input binary color planes through an input observation window, for example, a 3×3 window. The obtained single-plane vectors are combined into a multi-plane vector that may be used in a look-up table for descreening or other color conversion processes. As a result, various interactions between the color planes may be taken into account to provide, for example, optimum color space conversion. Specifically, because of the additional information obtained by using the multi-plane vector, the systems and methods of the invention provide a technique that performs color descreening, for example, with more accurate color values than the multiple, one-plane-at-a-time conventional methods.

These and other features and advantages of the systems and methods of this invention are described in or are apparent from the following detailed description of the exemplary embodiments.

BRIEF DESCRIPTION OF THE DRAWINGS

The exemplary embodiments of this invention will be described in detail, with reference to the following figures, wherein.

DETAILED DESCRIPTION OF PREFERRED EMBODIMENTS

Figure 1:
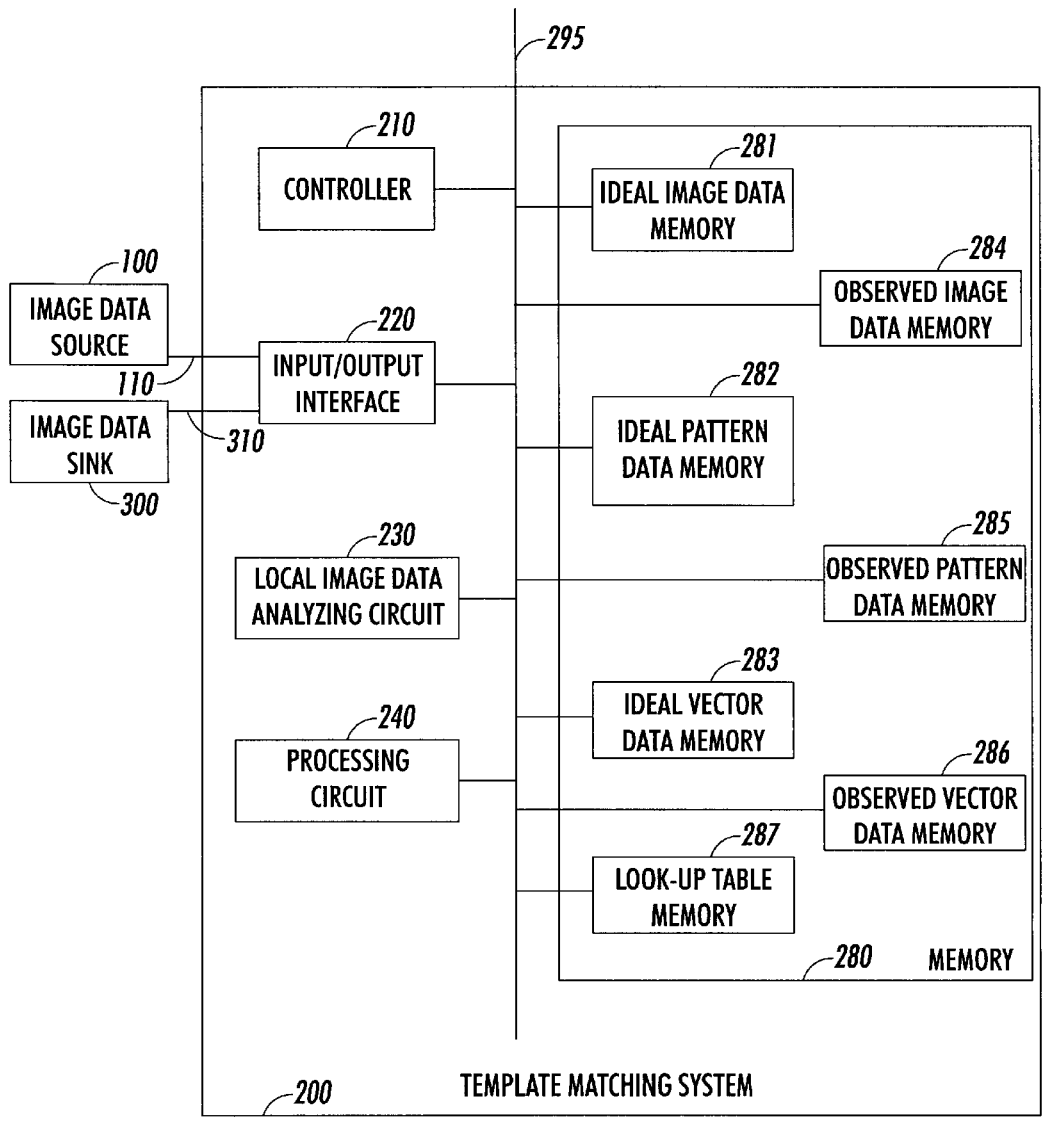
FIG. 1 is a functional block diagram of one exemplary embodiment of a system for modeling and reconstructing images in accordance with this invention.

FIG. 1 shows one exemplary embodiment of a generalized functional block diagram of a template matching system 200 according to this invention. The template matching system 200 is connected to an image data source 100 over a signal line or link 110 and to an image data sink 300 over a signal line or link 310. The image data source 100 provides a wide variety of image data to the template matching system 200. The image data sink 300 receives processed images output by the template matching system 200.

In general, the image data source 100 can be any one of a number of different sources, such as a scanner, a digital copier, a facsimile device that is suitable for generating electronic image data, or a device suitable for storing and/or transmitting electronic image data, such as a client or server of a network. Further, the image data source 100 does not necessarily have to be a single device, but rather may be formed by two or more separate devices. For example, one device may store training image data while the other device stores other binary image data.

Thus, the image data source 100 can be any known or later developed source that is capable of providing image data to the template matching system 200 of this invention. Similarly, the image data sink 300 can be any known or later developed device that is capable of receiving the processed image data output by the template matching system 200 and capable of either storing, transmitting, and/or displaying that processed image data. Thus, the image data sink 300 can be a channel device for transmitting reconstructed grayscale image data or enhanced image data, for example, for display or storage, a display device, or a storage device for indefinitely storing the reconstructed grayscale image or enhanced image data until there arises a need to display or further transmit the image data.

Furthermore, the channel device can be any known structure or apparatus for transmitting the image data from the template matching system 200 to a physically remote storage or display device. Thus, the channel device can be a public switched telephone network, a local or wide area network, an intranet, the Internet, a wireless transmission channel, any other distributing network, or the like. Similarly, the storage device can be any known structural apparatus for indefinitely storing the image data, such as a RAM, a hard drive and disk, a floppy drive and disk, an optical drive and disk, a flash memory, or the like. Finally, the display device can be any known device for displaying or rendering an image. Thus, the display device can be a CRT, an active or passive matrix LCD, an active or passive LED display, a laser printer, an ink jet printer, a digital copier, or the like.

Moreover, the image data source 100 and the image data sink 300 can be physically remote from the template matching system 200 and reachable over the channel device described above. Alternatively, the template matching system 200 can be integrated with either or both of the image data source 100 and the image data sink 300. For example, the image data source 100 can be a scanner of a digital photocopier, while the image data sink 300 is an image output terminal of a digital photocopier.

In accordance with the systems and methods of this invention, a look-up table, for example, is first created. The created look-up table includes various templates to transform an observed image into another image, i.e., an ideal image. Once the look-up table, including the templates, is created it is then implemented. That is, the look-up table is implemented to actually convert observed images to ideal images in practice. The template matching system 200 illustrates a system that performs both the process of creating the look-up table and the process of implementing the look-up table. However, it should be recognized that the look-up table may very well be, and probably is, transferred to another system for implementation that is separate from the system that actually created the look-up table.

As shown in FIG. 1, the template matching system 200 includes a controller 210, an input/output interface 220, a local image data analyzing circuit 230, a processing circuit 240, and a memory 280, each of which is connected to a data bus 295. The input/output interface 220 is also connectable to the image data source 100 and the image data sink 300 over the signal lines or links 110 and 310, respectively.

Additionally, as shown in FIG. 1, the memory 280 includes an ideal image data memory 281, an ideal image pattern data memory 282, an ideal image vector data memory 283, an observed image data memory 284, an observed image pattern data memory 285, an observed image vector data memory 286 and a look-up table memory 287.

The ideal image data memory 281 stores training image data, such as continuous image data. The ideal training image data is input from the image data source 100 through the input/output interface 220. The ideal training image data may alternatively be a binary color image including multiple color planes, for example. The ideal image pattern data memory 282 stores analyzed data information obtained from the input training image, such as pattern information representing the input training image. The ideal image vector data memory 283 stores analyzed data information obtained from the input training image, such as vector information representing the input training image.

Further, the observed image data memory 284 stores observed image data. This data may be input from the image data source 100 through the input/output interface 220, or alternatively, result from converting the ideal image in some manner. Specifically, the observed image data memory 284 may store observed image data generated in the local image data analyzing circuit 230. The observed image pattern data memory 285 stores analyzed data information obtained from the observed image such as pattern information representing the observed image. The observed image vector data memory 286 stores analyzed data information obtained from the observed image stored in the observed image data memory 284, such as vector information representing the observed image. The look-up table memory 287 stores look-up table data generated by the local image data analyzing circuit 230. The look-up table associates observed image data with ideal image data that corresponds to the observed image data. Once the look-up table is created, the took-up table may be used on a wide variety of systems and devices to convert an observed image to an ideal image.

The memory 280 also stores any necessary control programs and/or data required by the template matching system 200. Thus, the memory 280 can be implemented using static or dynamic RAM, a floppy disk and disk drive, a writable optical disk and disk drive, a hard disk and disk drive, flash memory, or the like. The memory 280 can also include read only memory, including PROMs, EPROMs, EEPROMs, a CD-ROM and disk drive, or the like.

In accordance with the systems and methods of this invention, an ideal image may be modeled and reconstructed from an observed image using the template matching system 200 shown in FIG. 1. However, to accomplish this, it is first necessary to perform a modeling process, i.e., a training process. The modeling process involves the creation of matching templates with a particular pattern in the observed image, i.e., a template matching process. The template matching process results in the creation of a look-up table.

Figure 2:
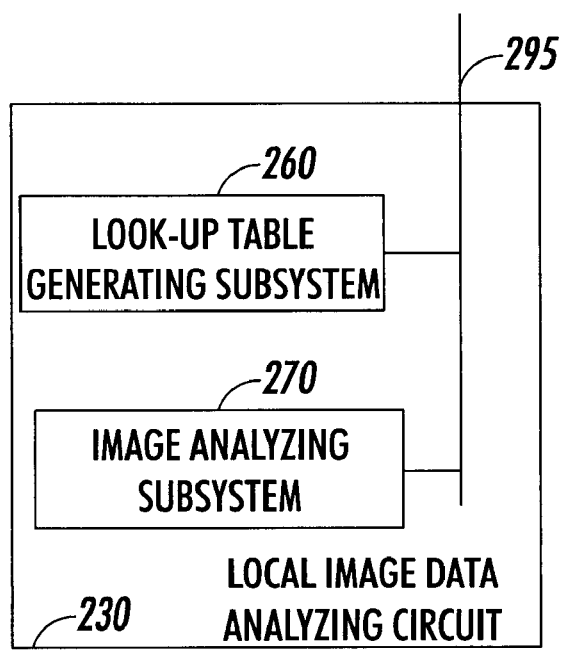
FIG. 2 is a functional block diagram showing one exemplary embodiment of the local image data analyzing circuit of FIG. 1 in accordance with this invention.

FIG. 2 is a functional block diagram showing one exemplary embodiment of the local image data analyzing circuit 230 of FIG. 1 in greater detail. As shown in FIG. 2, the local image data analyzing circuit 230 includes a look-up table generating subsystem 260 and an image analyzing subsystem 270. The look-up table generating subsystem 260 creates the look-up table in accordance with the systems and methods of this invention. The image analyzing subsystem 270 analyzes an image using the look-up table created by the look-up table generating subsystem 260. The image analyzing subsystem 270 is included in the template matching system 200 in accordance with this embodiment of the systems and methods of this invention since the template matching system 200 performs both the creation and the implementation of the took-up table. However, it should be appreciated that in a system that is used only to create the look-up table, the portions of the image analyzing subsystem 270 used to implement the look-up table can be omitted. The look-up table generating subsystem 260 and the image analyzing subsystem 270 are both connected to the data bus 295.

Figure 3:
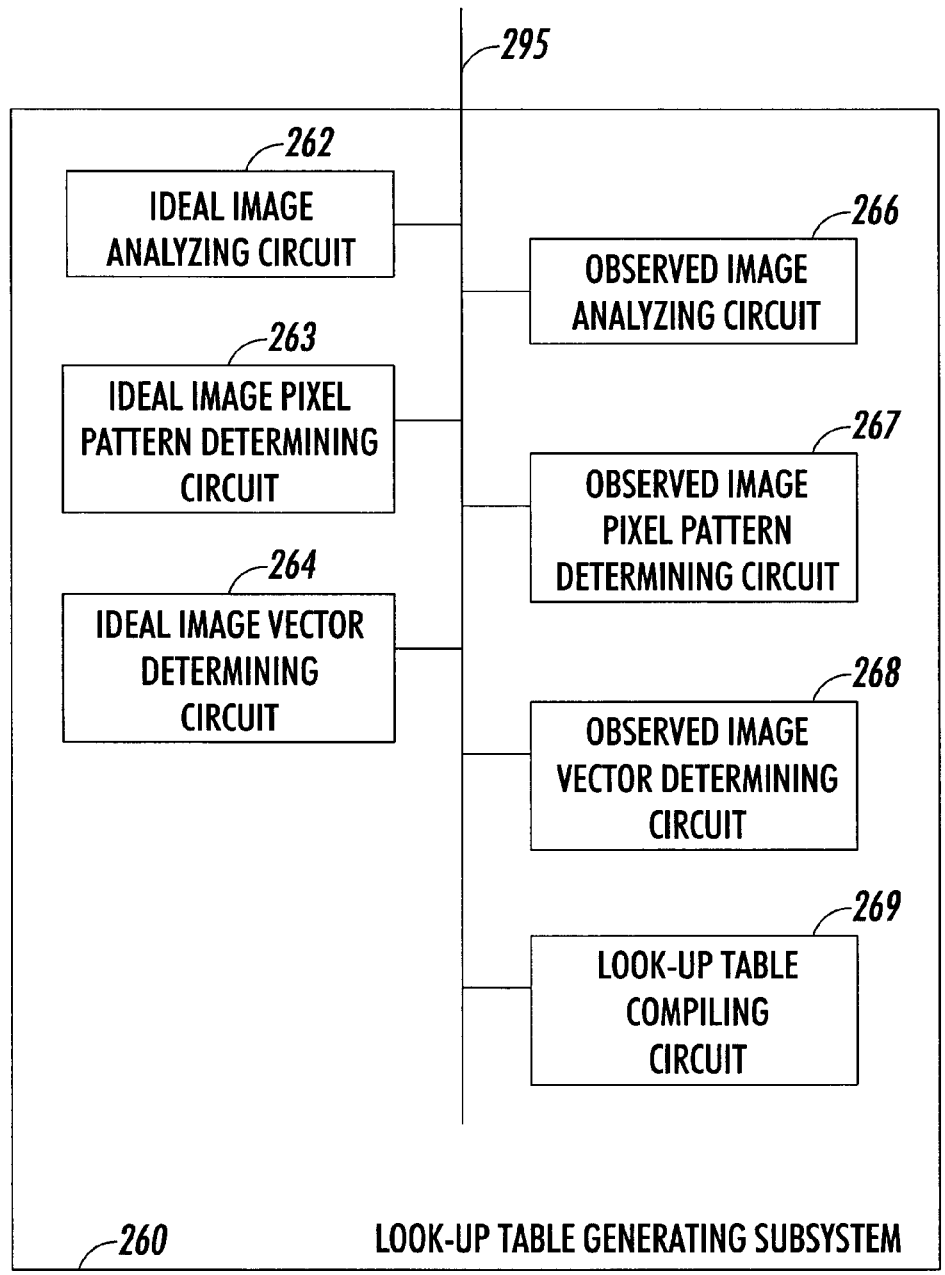
FIG. 3 is a functional block diagram showing one exemplary embodiment of the look-up table generating subsystem of FIG. 2 in accordance with this invention.
Figure 4:
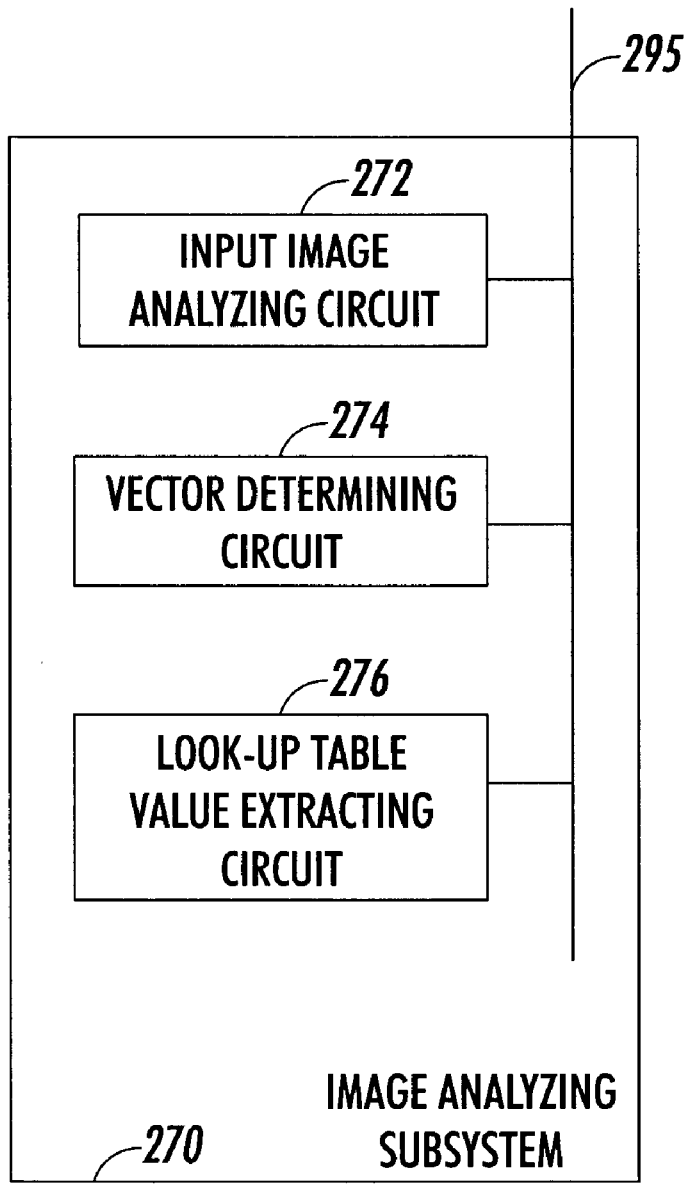
FIG. 4 is a functional block diagram showing one exemplary embodiment of the image analyzing subsystem of FIG. 2 in accordance with this invention.

Each of the look-up table generating subsystem 260 and image analyzing subsystem 270 include the subsystems shown in FIGS. 3 and 4, respectively. FIG. 3 is a function showinlemPlary embodiment of the look-up table generating subsystem 260 FIG. 2 greater detail. As shown in FIG. 3, the look-up table genera stem 260 includes an ideal image analyzing circuit 262, an ideal image pixel pattern determining circuit 263, an ideal image vector determining circuit 264, an observed image analyzing circuit 266, an observed image vector determining circuit 268, and a look-up table compiling circuit 269, each of which is connected to the data bus 295.

The ideal image analyzing circuit 262 performs the initial analysis of an ideal image to be processed. The ideal image pixel pattern determining circuit 263 determines the pixel pattern in the ideal image. The ideal image vector determining circuit 264 analyzes the pixel pattern determined by the ideal image pixel pattern determining circuit 263 and generates a vector representing the ideal pixel pattern.

The observed image analyzing circuit 266 performs initial analysis on an observed image obtained from the ideal image. The observed image pixel pattern determining circuit 267 determines the pixel pattern in the observed image. Further, the observed image vector determining circuit 268 analyzes the pixel pattern determined by the observed image pixel pattern determining circuit 267 and generates a vector representing the observed pixel pattern in the observed image.

The look-up table compiling circuit 269 compiles the information generated by the ideal image vector determining circuit 264 and the observed image vector determining circuit 268 and generates a look-up table based on the compiled information.

FIG. 4 is a functional block diagram showing in greater detail one exemplary embodiment of the image analyzing subsystem 270 of FIG. 2. As shown in FIG. 4, the image analyzing subsystem 270 includes an input image analyzing circuit 272, a vector determining circuit 274, and a look-up table value extracting circuit 276, each of which is connected to the data bus 295. The input image analyzing circuit 272 initially inputs an observed image to be analyzed and performs an initial analysis of that image. The vector determining circuit 274 performs fuirther analysis on the information generated by the input image analyzing circuit 272 and generates a vector set based on the information obtained by the input image analyzing circuit 272. The look-up table value extracting circuit 276 inputs the vector information generated in the vector determining circuit 274 and uses the vector information as input into a look-up table. The look-up table value extracting circuit 276 then extracts an appropriate value from the look-up table that corresponds to the input vector information.

In an exemplary learning or training process in accordance with the systems and methods of the invention, the controller 210 initiates the cration of a look-up table upon an ideal training image being input from the image data source 100 through the link 110. The ideal training image is then stored in the ideal image/data memory 281. In various embodiments of the systems and methods of this invention, the training image may be any one of a wide variety of images, depending on the particular observed image from which a higher image is to be reconstructed, for example.

In the exemplary embodiment of the template matching system 200 described below, the exemplary template matching system 200 converts the input ideal image to the observed image to create the pair of training images. However, it should be recognized that the systems and methods of this invention are not limited to generating the observed image through performing a conversion process on an ideal image. Rather, the systems and methods of the invention may also include separately inputting corresponding ideal and observed images. These corresponding ideal and observed images could be selected based on expert knowledge based on experimentation in a laboratory, for example.

In accordance with the systems and methods of this, invention, the ideal training image is input by the ideal image analyzing circuit 262 from the image data source 100. The input image is stored in the ideal image data memory 281. Then, the ideal image pixel pattern determining circuit 263 analyzes the ideal training image. In this exemplary embodiment, the ideal training image is a binary multi-plane image. However, it should be recognized that the systems and methods of this invention may be used in conjunction with a wide variety of image types, as is further described below. For example, the systems and methods may be used to perform a descreening process to transform a binary image to a grayscale image, for example.

The ideal image pixel pattern determining circuit 263 observes the pixel patterns in the binary ideal image and stores this image information, along with the associated target pixel information, in the ideal image pattern data memory 282. Then, the ideal image vector determining circuit 264 performs an analysis on the pixel patterns stored in the ideal image pattern data memory 282. Specifically, the ideal image vector determining circuit 264 converts the observed pixel patterns to multi-plane vectors. After the ideal image vector determining circuit 264 determines, for each pixel, the multi-plane vector representing the training image, this vector data and pixel position data are stored in the ideal image vector data memory 283.

The template matching system 200 in accordance with this invention performs a template matching process for a binary color image having multiple color planes, for example. In the various exemplary embodiments of the template matching systems and methods of this invention described herein, the ideal and observed images each have four color planes. However, the invention is not limited to four color planes. Rather the template matching systems and methods of this invention may be used to process and manipulate images with three, two or even one color plane, so long as the image is represented by at least two vectors, or other equivalent mathematical expression. As used herein, a "vector" is intended to denote a mathematical expression that that expresses, in some form, the properties of an image or a portion of an image. Alternatively, an image having greater than four color planes may be processed in accordance with the template matching systems and methods of this invention. Further, as used herein, a "value" is intended to denote information in any of a wide variety of forms. For example, a single value may include a number of values, which may be characterized as sub-values.

The template matching system 200 provides an improved look-up table for associating an ideal image with an observed image. In particular, the template matching system 200 uses target pixel information, as well as neighborhood information, from each of the color planes simultaneously to form input vectors for the look-up table. Further, the look-up table generated and stored in accordance with the invention outputs converted color information for all color planes of the output pixel.

In creation of the look-up table, the ideal image analyzing circuit 262 scans a suitable sliding window across the pixels of the ideal training image. Specifically, using the sliding window, for example, the ideal image pixel pattern determining circuit 263 sequentially observes all the pixels in all the color planes in the ideal image. As the sliding window scans across the pixels of the ideal image, information will be generated for a particular specified pixel at a given time, i.e., the target pixel, in a given color plane.

The ideal image pixel pattern determining circuit 263 scans the window along the fast-scan direction, i.e., along the horizontal direction. Specifically, the ideal image pixel pattern determining circuit 263 inputs the pixel information starting at an arbitrary first target pixel and an arbitrary first color plane. The ideal image pixel pattern determining circuit 263 observes the first target pixel in the first color plane. The observed pattern information is stored in the ideal image pattern data memory 282. Then, the ideal image pixel pattern determining circuit 263 observes and stores pattern information of the first target pixel in the second color plane. Thereafter, the ideal image pixel pattern determining circuit 263 observes and stores pattern information of the first target pixel in the third and fourth color planes, respectively.

Once the first target pixel is observed in each color plane, the ideal image pixel pattern determining circuit 263 moves the window to a second target pixel. In a manner similar to the observation of the first target pixel, the ideal image pixel pattern determining circuit 263 sequentially observes the second target pixel in each color plane. The observed pattern information is stored in the ideal image pattern data memory 282. Once all the color planes are observed for the second target pixel, the ideal image pixel pattern determining circuit 263 moves the window to a third target pixel, a fourth target pixel, and so forth until the entire image has been input.

Eventually, the last target pixel in all four color planes in the ideal image will be observed. As a result, target pixel pattern information for each target pixel in each color plane in the ideal image will be stored in the ideal image pattern data memory 282. Specifically, in accordance with the training process of the template matching system 200, the ideal image pixel pattern determining circuit 263 generates data indicative of the specific pixel pattern for each observed target pixel in each color plane of the ideal training image. This pattern data, along with the coordinates of the associated target pixel, is stored in the ideal image pattern data memory 282.

As described above, the ideal image pixel pattern determining circuit 263 observes all the color planes for a certain target pixel, and then moves to the next target pixel. However, the systems and methods of the invention are not limited to such technique. Alternatively, the ideal image pixel pattern determining circuit 263 could observe each target pixel in a first color plane. Once each target pixel is observed in the first color plane, the ideal image pixel pattern determining circuit 263 would then observe each target pixel in the second color plane, and so forth. For example, the acquired information could be stored in a suitable buffer memory.

Once the input ideal training image is analyzed, the controller 210 controls the processing circuit 240 to convert the input ideal training image stored in the ideal image data memory 281 to a corresponding observed training image. This conversion is performed to create a second member of a training pair of images. The first member is the ideal image. The particular conversion process performed on the ideal training image will vary depending on the particular application of the template matching system 200. For example, the particular conversion process may be halftoning, inverse half-toning or descreening, decomposition, segmentation, color space conversion, resolution enhancement, noise filtering, or any other known or later developed conversion process for a color or monochrome image.

However, as described above, the systems and methods of this invention are not limited to generating the observed training image, i.e., the observed image, by converting an ideal image. Rather, the systems and methods of the invention may also include separately inputting corresponding ideal and observed training images. These corresponding ideal and observed training images could be selected based on expert knowledge, for example.

As a result of the conversion process, an observed image is generated, i.e., converted from the ideal image, by the processing circuit 240 and is stored in the observed image data memory 284. The look-up table generating subsystem 260 includes an observed image analyzing circuit 266 to analyze the observed image.

Figure 5:
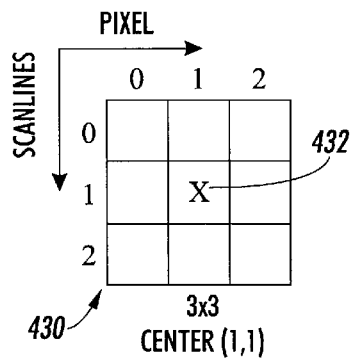
FIG. 5 is a diagram showing one exemplary window in accordance with this invention.

The observed image analyzing circuit 266 retrieves the observed training image from the observed image data memory 284. Then, the observed pixel pattern determining circuit 267 scans a sliding window, such as the 3×3 window 430, as shown in FIG. 5, across the pixels of the observed training image. Using the sliding window, the observed image pixel pattern determining circuit 267 observes, for a particular target pixel, the observed image data values for the neighboring pixels in the color planes in the observed image. The observed image pixel pattern determining circuit 267 inputs the pixel information starting at an arbitrary first target pixel and a predetermined arbitrary first color plane in the observed image. The observed image pixel pattern determining circuit 267 observes the first target pixel's neighborhood in the first color plane. The observed pattern information is stored in the observed image pattern data memory 285. Then, the observed image pixel pattern determining circuit 267 observes and stores pattern information of the first target pixel's neighborhood in the second color plane. This pattern information is then also stored in the observed image pattern data memory 285. Thereafter, the observed image pixel pattern determining circuit 267 observes and stores pattern information of the first target pixel's neighborhood in the third and fourth color planes of the observed image, respectively.

The observed image pixel pattern determining circuit 267 uses a sliding window technique to analyze the observed image. Illustratively, a 3×3 sliding window may be used by the observed image pixel pattern determining circuit 267. The observed image pixel pattern determining circuit 267 scans the sliding 3×3 window across the image data of the observed image stored in the observed image data memory 284.

FIG. 5 shows one illustrative example of such a 3×3 sliding window. As shown in FIG. 5, a sliding window 430 includes an array of pixels including 3 rows, with vertical coordinates 0–2, respectively, and three columns, with horizontal coordinates 0–2, respectively. The horizontal axis represents the fast scan direction, while the vertical axis represents particular pixels in the slow scan direction. The sliding window includes a target pixel 432. For example, the sliding 3×3 window 430 includes a center or target pixel 432 located at the coordinates (1,1). The target pixel 432 is used to analyze the observed image stored in the observed image data memory 284. However, it should be recognized that various other types of windows may be used by the observed image pixel pattern determining circuit 267.

Figure 6:
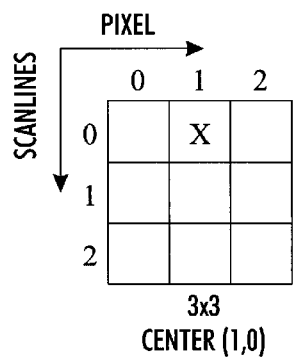
FIG. 6 is a diagram showing another exemplary window in accordance with this invention.
Figure 7:
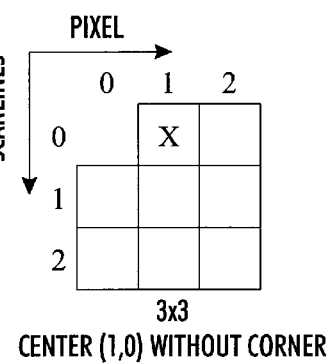
FIG. 7 is a diagram showing another exemplary window in accordance with this invention.

FIGS. 6 and 7 illustrate alternative types of windows. These windows, as well as other windows, may be used by the observed image pixel pattern determining circuit 267 in accordance with the systems and methods of the invention, in place of the window 430. For example, FIG. 6 shows a 3×3 window with the center or target pixel positioned at the (1,0) coordinates. Further, the particular window to be used is not limited to a 3×3 window. Illustratively, FIG. 7 shows a window having a slightly varied, asymmetrical shape. Further, various other suitable windows may be used, for example, such as a window formed into a 3×2 array with the target pixel at (1,0) coordinates.

It should be recognized that the particular sliding window used in any particular embodiment of the template matching systems and methods according to this invention will depend on the particular requirements of the particular image being analyzed. Additionally, the particular location of the target pixel within the sliding window will depend on the requirements of the particular application.

Once the first target pixel's neighborhood is observed in each color plane, the observed image pixel pattern determining circuit 267 moves the window to a second target pixel. In a manner similar to observing the neighborhoods of the first target pixel in the observed image, the observed image pixel pattern determining circuit 267 sequentially observes the neighborhood of the second target pixel in each color plane. The observed pattern information is stored in the observed pattern data memory 285. Once all the color planes are observed in the second target pixel's neighborhood, the observed image pixel pattern determining circuit 267 moves the window to the third target pixel, the fourth target pixel, and so forth.

Eventually, the neighborhood of the last target pixel in all four color planes in the observed image will be observed. As a result, target pixel pattern information for each target pixel in each color plane will be stored in the observed pattern data memory 285. Specifically, in accordance with the training process performed by the template matching system 200, the observed image pixel pattern determining circuit 267 generates data indicative of the specific pattern data for each observed target pixel in each color plane of the observed training image. This pattern data, along with the coordinates of each associated target pixel, is stored in the observed image pattern data memory 285.

As described above, the observed image pixel pattern determining circuit 267 observes all the neighborhoods in each color plane for a certain target pixel, and then moves to the next target pixel. Alternatively, the observed image pixel pattern determining circuit 267 could observe all the target pixel's neighborhoods in a first color plane. Once the neighborhood around each target pixel is observed for the first color plane, the observed image pixel pattern determining circuit 267 would then observe the neighborhood around each target pixel in the second color plane, and so forth.

Accordingly, complete pattern data information for each color plane of the ideal image is stored in the ideal image pattern data memory 282. Also, complete pattern information for each color plane in the observed image is stored in the observed image pattern data memory 285. Once this information is accumulated, the look-up table generating subsystem 260 associates the pixel values in the ideal image with the pixel values in the observed image. That is, the look-up table generating subsystem 260 generates a look-up table that maps the observed image to the ideal image.

The ideal image vector determining circuit 264 of the look-up table generating subsystem 260 begins the mapping process by retrieving the ideal image pixel pattern information from the ideal image pattern data memory 282. The ideal image vector determining circuit 264 retrieves pixel pattern information for a first pixel for a first color plane. The ideal image vector determining circuit 264 then vectorizes this first pixel pattern information to form a first vector, which represents the first pixel. Then, the ideal image vector determining circuit 264 retrieves the first pixel pattern information for the second-fourth color plane and vectorizes this information into second-fourth vectors, respectively.

Then, in accordance with the systems and methods of the invention, the ideal image vector determining circuit 264 combines the first-fourth vectors into a single vector. This single vector, obtained using a window for a CMYK color binary image represents the observed pixel in the ideal image. Then, the ideal image vector determining circuit 264 stores this combined vector in the ideal image vector data memory 283, along with the target pixel coordinates associated with the combined vector.

In accordance with the systems and methods of the invention, after the ideal image vector determining circuit 264 analyzes the first target pixel in a training image, as described above, the ideal image vector determining circuit 264 then retrieves the pixel patterns for the next target pixel from the ideal image pattern data memory 282. The ideal image vector determining circuit 264 analyzes the pixel patterns for the next target pixel in each color plane as described above. As a result, the ideal image vector determining circuit 264 generates a combined vector for the second target pixel of the ideal image. The ideal image vector determining circuit 264 continues this process until all the pixel patterns for each color plane in the ideal image pattern data memory 282 are vectorized for each target pixel.

The observed image vector determining circuit 268 of the look-up table generating subsystem 260 begins by retrieving the observed pattern information from the observed image pattern data memory 285. The observed image vector determining circuit 268 then retrieves pixel pattern information for a first pixel for a first color plane in the observed image. The observed image vector determining circuit 268 then vectorizes this first pixel pattern information to form a first vector. For example, if the first color plane is the cyan color plane, this results in a vector "$c_1, c_2, \ldots c_9$". Then, the observed image vector determining circuit 268 retrieves the first pixel pattern information for the second-fourth color plane and vectorizes this information into second-fourth vectors, respectively. For example, if the second-fourth color planes are magenta, yellow and black color planes, respectively, this results in three vectors "$m_1 \, m_2 \ldots m_9$", "$y_1, y_2 \ldots y_9$" and "$k_1, k_2 \ldots k_9$", respectively. Then, the observed image vector determining circuit 268 combines the first-fourth vectors into a single vector. This single vector, obtained using a 3×3 window for a CMYK color observed binary image, is then written in the form of a 36 element vector "$c_1, c_2, \ldots c_9, m_1, m_2, \ldots m_9, y_1 \, y_2 \ldots y_9, k_1, k_2, \ldots k_9$". Then, the observed image vector determining circuit 268 stores this combined vector in the observed image vector data memory 286, along with the target pixel coordinates associated with the combined vector.

The observed image vector determining circuit 268 then retrieves the pixel patterns for the next target pixel from the observed image pattern data memory 285. The observed image vector determining circuit 268 analyzes the pixel patterns for the next target pixel in each color plane as described above. As a result, the observed image vector determining circuit 268 generates a combined vector for the second target pixel of the observed image. The observed image vector determining circuit 268 continues this process until all the pixel patterns for each color plane in the observed image pattern data memory 285 is vectorized for each target pixel.

As a result, complete vector information for each target pixel of the observed image is stored in the observed image vector data memory 286, while complete vector information for each target pixel of the ideal image is stored in the ideal image vector data memory 283. As should be apparent, each target pixel in the ideal image corresponds to a target pixel in the observed image, i.e., since the ideal image and the observed image form a training pair. As a result, the look-up table compiling circuit 269 of the look-up table generating subsystem 260 uses this correspondence to associate the vectors in the ideal image vector data memory 283 with the vectors in the observed image vector data memory 286. Specifically, the look-up table compiling circuit 269 links or maps each vector stored in the ideal image vector data memory 283 with a corresponding vector in the observed image vector data memory 286 by matching the corresponding target pixels.

Further, in accordance with the systems and methods of the invention, the mapping may include some adjustments. The specific adjustments may be based on expert knowledge, for example. Illustratively, the adjustments may be made to account for certain degradations. Such degradations may occur, i.e., be known by experts to occur, when there are certain interrelationships between the color planes, for example.

The compiled look-up table is stored in the look-up table memory 287. As described above, the look-up table may then be transferred to a physically separate system in which the look-up table is implemented. Further, the electronic storage capabilities of the separate system may be limited. It should also be recognized that the look-up table may potentially have an exceedingly large number of entries. The large number of entries is a result of all the possible combinations of pixels in the three or four co-located windows, for example. However, the number of entries may be reduced in accordance with the systems and methods of the invention.

Specifically, it should be appreciated that only a small percentage of the vectors present in either the ideal image or the observed image may possess a high frequency of occurrence. As a result, this limited high frequency of occurrence allows the look-up table compiling circuit 269 to choose only the most important, e.g., frequently occurring, vectors to be included in the look-up table, for example. However, the particular manner by which the look-up table compiling circuit 269 chooses which pixel vectors to include in the look-up table will vary depending the particular application. Thus, in addition to frequency, the vectors included in the look-up table may be selected based on a maximum value, a minimum value, and/or a measure of central tendency, for example.

Illustratively, as explained below, in accordance with one exemplary embodiment of the template matching system 200 of the invention, the vectors in both the ideal image vector data memory 283 and the observed image vector data memory 286 are divided into classes. Specifically, the ideal image vectors stored in the ideal image vector data memory 283 are separated into classes by the look-up table compiling circuit 269. Then, the look-up table compiling circuit 269 observes the number of ideal image vectors $V_h$ that are included in each class. The look-up table compiling circuit 269 compares the number of ideal image vectors $V_h$ with a predetermined threshold number $N_h$. If $V_h$ is greater than $N_h$, then the class of vectors is retained in the ideal image vector data memory 283. In contrast, if $V_h$ is less than $N_h$, then the frequency of the vectors contained in that class is insufficient to justify its inclusion in the look-up table. As a result, that class of vectors will be deleted from the memory 280. The threshold number or threshold value may be determined based on expert knowledge or on some statistical analysis, for example.

After the look-up table compiling circuit 269 has analyzed all the ideal image vector classes, only those ideal image vectors that belong to a retained class will still be stored in the ideal image vector data memory 283. These remaining ideal image vectors continue to be associated with their corresponding target pixels.

Then, the look-up table compiling circuit 269 establishes classes of the observed image vectors. The observed image vectors stored in the observed image vector data memory 286 are separated into observed image vector classes by the look-up table compiling circuit 269. Then, the look-up table compiling circuit 269 observes the number of observed image vectors $V_1$ that are included in each class. The look-up table compiling circuit 269 compares the number of vectors $V_1$ with a predetermined threshold number $N_1$. If $V_1$ is greater than $N_1$, then the class of vectors is retained in the observed image vector data memory 286. In contrast, if $V_1$ is less than $N_1$, then the frequency of the vectors contained in that class is insufficient to justify its inclusion in the look-up table. As a result, that class of vectors will be deleted from the memory 280.

After the look-up table compiling circuit 269 has analyzed all the observed image vector classes, only those observed image vectors that belong to a retained class will be stored in the observed image vector data memory 286. These remaining observed image vectors continue to be associated with their corresponding target pixels.

Then, the look-up table compiling circuit 269 identifies each remaining observed image vector that does not have its corresponding ideal image vector as one of the remaining ideal image vectors. In accordance with one exemplary embodiment of the template matching system 200 of this invention, the look-up table compiling circuit 269 deletes all the observed target pixels that do not have a remaining corresponding ideal image target pixel.

The vectors in each class may then be averaged. To average the classes, the look-up table compiling circuit 269 relies upon, i.e., uses, the classes of the ideal image vectors. Specifically, the look-up table compiling circuit 269 averages all the remaining ideal image vectors of a first one of the ideal image classes to obtain a value $A_h$. The value of $A_h$ is the averaged ideal image vector that represents the first class in the look-up table.

Then, the look-up table compiling circuit 269 generates an averaged observed image vector that corresponds to $A_h$. In generating the averaged observed vector, the look-up table compiling circuit 261 does not rely on the observed classes previously established. Rather, the look-up table compiling circuit 269 ascertains the ideal image vectors in the first class. Then, the look-up table compiling circuit 269 retrieves all the observed image vectors that correspond to each ideal image vector in the first class. All these retrieved observed image vectors are then averaged to obtain the value $A_1$. The value $A_1$ is the averaged observed image vector that represents the first class in the look-up table. Accordingly, the look-up table is provided with corresponding values for the first class of ideal image vectors. The look-up table compiling circuit 269 then generates an average value for each remaining ideal image class of vectors, until all the classes of ideal image vectors are analyzed. If the vectors in each remaining ideal image class of vectors is in fact the same, then it is not necessary to determine an average. As a result, each ideal image class will have a representative ideal image vector in the look-up table. Further, each representative ideal image vector in the look-up table will have a corresponding observed representative vector in the look-up table.

This approach does not rely upon the originally defined classes of the observed image vectors. Rather, this approach redefines the observed image vectors based on the ideal image classes, and in a sense, treats the ideal image classes as the dominate class. However, it should be recognized that the originally defined observed classes will generally correspond to the redefined observed classes. This occurs because the correspondence between the ideal image vectors and the observed image vectors, i.e., the ideal image pixel patterns and the observed pixel patterns, is generally consistent. Thus, if the correspondence is consistent, the same or similar observed image vectors will in general correspond to a group of the same or similar ideal image vectors. This is true whether the correspondence is based purely on the properties of the vectors, i.e., the originally defined observed classes, or purely on common target pixels, i.e., the redefined observed classes.

Further, it should be recognized that the ideal image classes do not have to be the dominate class in the systems and methods of this invention. Rather, the observed classes may be the dominate classes in some applications. In this case, the ideal image classes would be redefined based on the observed classes.

For example, a class of ideal pixels may be established that match a particular observed pixel pattern. Thus, the corresponding class of observed pixels would include pixels having the particular observed pixel pattern. Alternatively, the class of observed pixels may include pixels having approximately the same pixel pattern, i.e., a fuzzy class. Further, the class of ideal pixels may be represented by averaging the ideal pixels that match the particular observed pixel pattern. However, it should be appreciated that the classes may be established using any of a wide variety of known or later developed methods.

Using the training process described above, a look-up table is generated and stored in the look-up table memory 287. The look-up table is used by the template matching system 200 to input and convert an observed image to an ideal image. Thus, using the training process as described above, the look-up table is completed and ready to be implemented in any suitable device.

The template matching system 200 as described creates a look-up table, which will be implemented to map an observed image to an ideal image. However, it should be recognized that the systems and methods of this invention are not limited to using a look-up table, i.e., an association tool of sorts. Rather, the systems and methods and methods as described above may be applied to other association tools, other than a look-up table. For example, the mapping between data may be accomplished using a logic circuit or a system of equations that processes information regarding input data to generate output data. For example, a Boolean logic circuit may be employed using a logical sum of products. Alternatively, it should be recognized that the mapping may be accomplished using expert knowledge in a laboratory in a wide variety of ways to relate input data to desired output data.

Once the look-up table generating subsystem 260 has generated the look-up table and it is available in the look-up table memory 287, the modeling and reconstruction system 200 is able to convert a variety of binary images to an equivalent grayscale image, for example. The binary image to be converted is input, or has been previously input, from the image data source 100 through the input/output interface 220 under control of the controller 210.

For example, with reference to FIG. 4, an observed image for conversion may be input from the image data source 100 through the input/output interface 220 under control of the controller 210. The observed image is analyzed using the input image analyzing circuit 272 in the image analyzing subsystem 270. The observed image is analyzed using the window 430 shown in FIG. 5 or any other known or later developed window that was used to generate the entries in the look-up table.

Illustratively, the observed image to be converted may be a binary image CMYK color image. Further, it may be necessary or desirable to convert the binary color image to an image of enhanced resolution using the look-up table stored in the look-up table memory 287. To analyze the observed image, the input image analyzing circuit 272 scans, or observes, the observed image starting at a first target pixel, including its neighborhood, in the first color plane and generates pixel pattern information that is stored in the observed image pattern data memory 285. The input image analyzing circuit 272 then observes the neighborhood around the first target pixel for the second, third and fourth color planes and inputs the obtained pixel pattern information to the observed image pattern data memory 285, where it is stored.

Then, the vector determining circuit 274 analyzes the accumulated pattern information from all the color planes for the first target pixel. The vector determining circuit 274 generates an observed image vector that represents the input pattern information. This observed image vector is stored in the observed image vector data memory 286.

Then, the input image analyzing circuit 272 similarly observes each remaining target pixel. Then, the vector determining circuit 274 analyzes the accumulated pattern information for each remaining target pixel. The vector determining circuit 274 generates, for each remaining target pixel, an observed image vector that represents the input pattern information for that target pixel. These observed image vectors are stored in the observed image vector data memory 286.

As a result, all the vectors that represent the observed binary color image are stored in the observed image vector data memory 286. Then the look-up table value extracting circuit 276, based on the observed image vector obtained for each pixel in the binary image, extracts a corresponding value from the look-up table. Specifically, the look-up table value extracting circuit 276 uses the look-up table stored in look-up table memory 287. The look-up table contains vectors of the binary image and the corresponding enhanced binary image values. Accordingly, the look-up table value extracting circuit 276 can extract the ideal image data that corresponds to the input observed image data.

In the training of the look-up table, only particular vectors may be selected to be included in the look-up table as described above. However, inclusion may be based on parameters other than frequency of occurrence in a class of vectors. For example, the selected vectors to be included in the look-up table may be vectors that have some peculiarities. Such peculiar vectors may include, for example, those vectors where conventional averaging techniques do not accurately convert, or map, the observed image to the ideal image. As a result, these particular peculiar vectors will be stored. However, if conventional averaging techniques do provide an accurate mapping, there is no need to store those accurately converted vectors in the look-up table. As a result, the size of the look-up table may be substantially decreased.

Also, other techniques may be used to limit the size of the look-up table. For example, the window that is initially used to observe the ideal image and the observed image may be weighted in some manner. The data of an observed neighborhood could thus be weighted in some manner so as to limit inclusion of the data in the look-up table. For example, a threshold value may be used to compare with the weighted data.

Accordingly, the look-up table value extracting circuit 276 inputs the observed image vector into the look-up table and determines if there is a match. If the particular observed image vector is not contained in the look-up table, averaging techniques may be applied, instead of relying on the mapping performed by the look-up table data. Illustratively, a weighted averaging technique may be used if an observed value is not contained in the look-up table. As a result, the look-up table value extracting circuit 276 in the image analyzing subsystem 270 associates each pixel in the observed binary color image with an appropriate set of ideal image values. Once all of the pixels in the observed image have been analyzed, the ideal image is generated. This ideal image may then be directly output by the controller 210 to the image data sink 300.

The systems and methods of the invention provide increased accuracy for various conversion processes, including resolution enhancement and halftoning. Furthermore, the template matching systems and methods of this invention optimize a generated image, taking into account the interrelationship between color planes. Specifically, the single multi-plane vector representing the windowed binary pixels, obtained from the input color planes, could point to gray values in a different color space, such as, for example, the red, green, blue (RGB) color space. The template matching systems and methods of the invention thus allow color conversion to be performed using image information that is not employed in single color-plane conversion methods that use single plane analysis. As in the case of a simple halftoning process, the filters for halftoning with color conversions may be designed in a manner that generates a statistically optimal look-up table from a set of training images. This look-up table could take into account any particularities that occur between color planes for certain patterns or gray levels, for example.

The exemplary embodiment of the template matching systems and methods of the invention, described above in conjunction with FIGS. 1–8, relate to image resolution enhancement in general. Image resolution enhancement may employ a template matching process that transforms a binary bit map into multiple bits per pixel or a higher spatial sampling resolution with the goal being to improve the appearance of the resulting printed image. However, the template matching systems and methods of this invention are not limited to resolution enhancement. In addition, other potential applications include halftoning applications, resolution conversion, appearance tuning, restoration, and restoration of text acquired with color scanners.

Halftoning applications may involve a process of inputting a particular multi-plane binary pattern into a look-up table and outputting a specified grayscale value, or alternatively, inputting a specified grayscale value into a look-up table and outputting a particular binary pattern. A resolution conversion process may be implemented to map from one resolution to another, e.g., 300 spots per inch (spi) to 600 spi. The resolution conversion process may be performed with or without attempting to enhance the appearance of the image. An appearance tuning process may be implemented using the systems and methods of the invention. For example, the digital darkness of an image may be controlled, i.e., a document bitmap may be mapped to an image to yield a printed image with a desired degree of darkness on a given printing device. Restoration, and particularly restoration of text acquired using color scanners, may be used to insert probable contour information when mapping from a binary bitmap to a partial grayscale digital image, for example.

Further, the systems and methods of this invention may be used for implementation of resolution enhancement technology for text/line art with colored foreground/background, as well as for cleaning scanned images, or image segmentation processes, for example. Further, these applications may be used in conjunction with full color or for highlight color images. It should also be recognized that in accordance with the template matching systems and methods of this invention, the number of templates in a filter can be minimized by using symmetry reduction techniques, such as rotations.

It should be recognized that the template matching systems and methods of the invention described above use neighborhood information from all color planes simultaneously as input to a look-up table. However, the template matching systems and methods invention are not limited to this particular technique. Instead, the template matching systems and methods of the invention may look at each color plane separately, and use a black plane, for example, as an address to a look-up table.

That is, the template matching systems and methods of the invention may look at the respective planes in a hierarchical manner. One predetermined color plane will be analyzed first. Illustratively, the black color plane may be chosen over the magenta color plane, i.e., black chosen as the dominate color plane. Further, the magenta color plane may be chosen over the cyan color plane, for example. The black color plane will provide an initial address into a look-up table. Then, within that address for the black plane, there will be sub-addresses for the magenta color plane. Furthermore, in each sub-address for the magenta color plane, there will be sub-sub-addresses for the cyan color plane. As a result, the black color plane will control what area of the look-up table is used for searching for the magenta and cyan color planes.

However, it should be recognized that the black color plane is not necessarily the dominate color plane. Alternatively, any other color plane could be used as the dominate color plane, i.e., as the initial address in the look-up table. The particular color plane will depend on the particular application of the template matching systems and methods of the invention Further, the data storage capabilities of the template matching system 200 may be limited. As a result, it should be recognized that for a CMYK image, for example, information from all the color planes does not necessarily have to be stored in the generated look-up table. That is, the generated look-up table need not use all four color planes. Rather, the black plane or, alternatively, the black plane and one color plane may be sufficient for a particular application.

Figure 8:
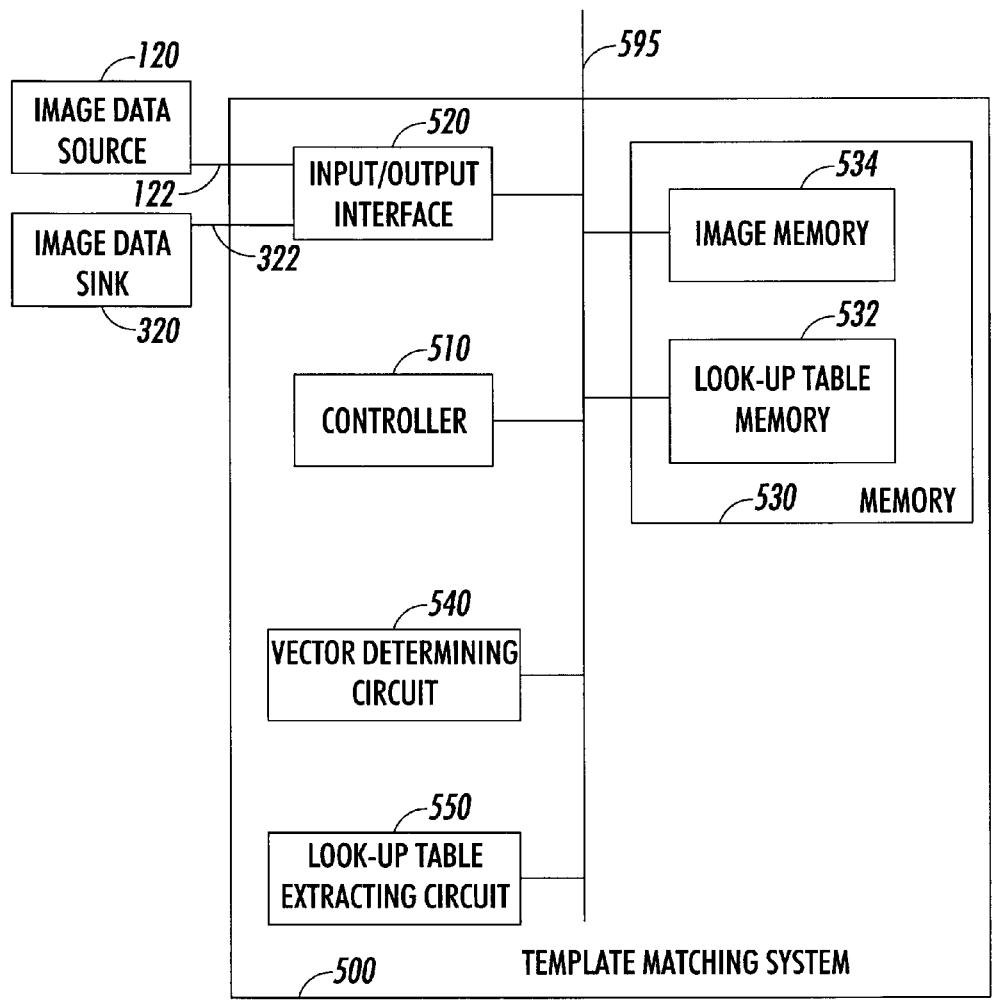
FIG. 8 is a functional block diagram of one exemplary embodiment of a system for modeling images in accordance with this invention.

FIG. 8 is a functional block diagram of a second exemplary embodiment of a template matching system 500 in accordance with this invention. As shown in FIG. 8, a template matching system 500 includes a controller 510, an input/output interface 520, a vector determining circuit 540, a look-up table extracting circuit 550 and a memory 530, each of which is connected to a data bus 595. The input/output interface 520 is also connectable to an image data source 120 and an image data sink 320 over signal lines or links 122 and 322, respectively. Additionally, as shown in FIG. 8, the memory 530 includes a look-up table memory 532 and an image memory 534. The template matching system 500 might be implemented on a personal printer, for example.

The controller initially inputs an observed image to be analyzed and stores the input image in the image memory 534. The vector determining circuit 540 analyzes the input image to generate a vector set based on the analysis of the image. The look-up table value extracting circuit 550 processes the vector information generated in the vector determining circuit 540 and uses the vector information as input into a look-up table stored in the look-up table memory 532. The look-up table value extracting circuit 550 then extracts an appropriate value from the look-up table that corresponds to the input vector information.

Figure 9:
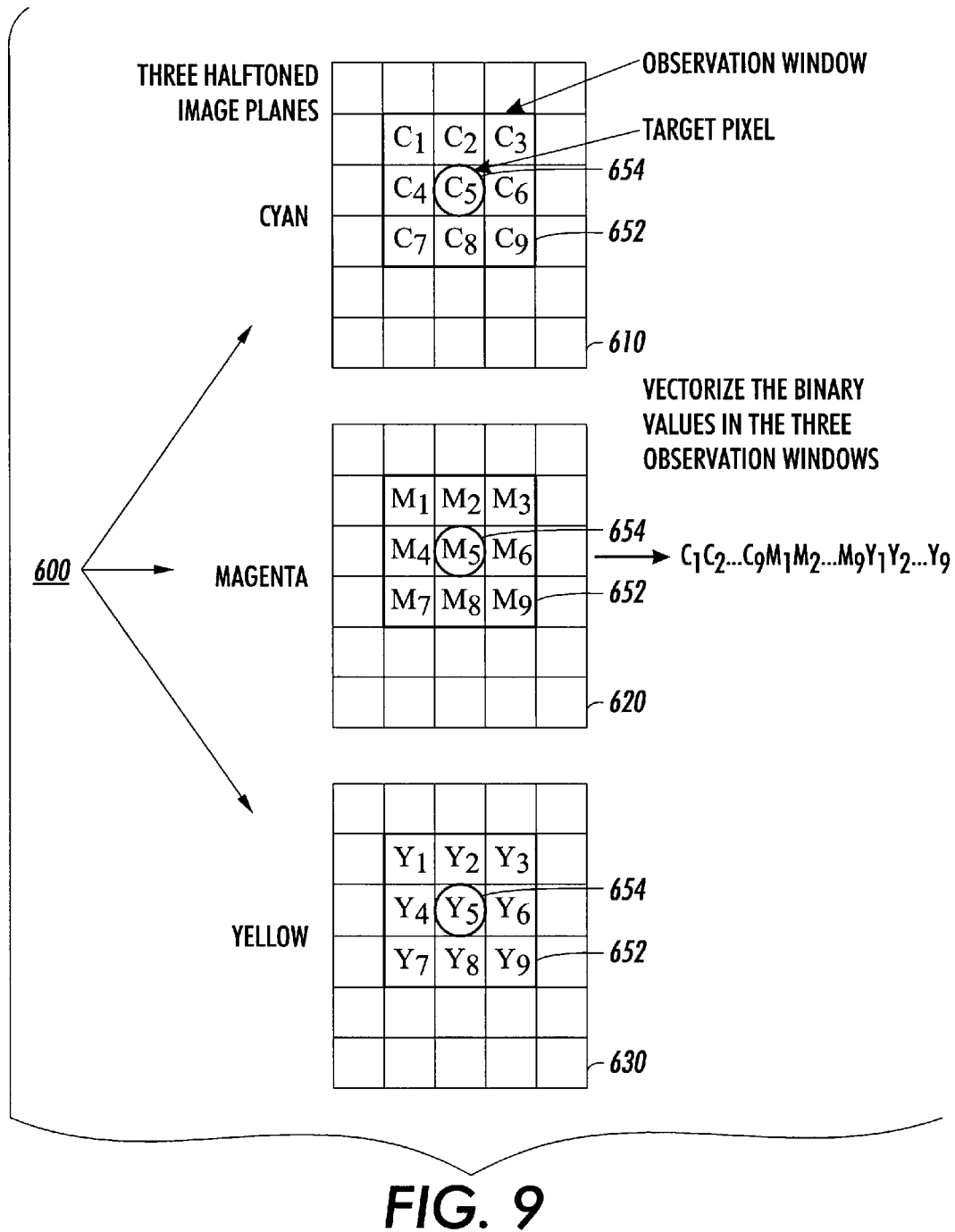
FIG. 9 is a diagram showing an exemplary halftoned image having three color planes and analysis of the color planes in accordance with this invention.

FIG. 9 illustrates an application of the systems and methods of the invention to transform a binary or halftoned image to a grayscale image, i.e., to perform a descreening process. The image 600 shown in FIG. 9 includes three color planes. The three color planes include a cyan color plane 610, a magenta color plane 620 and a yellow color plane 630. The image 600 may be descreened by the modeling system 500, i.e., converted from a halftone image to a grayscale image.

In the modeling system 500, the controller 510 inputs the image 600 from the image data source 120 and stores the image data in the image memory 534. Then the vector determining circuit 540 analyzes the image data in accordance with the systems and methods of this invention. Specifically, the vector determining circuit 540 observes a first neighborhood 652 surrounding a first target pixel 654 in the image 600.

The vector determining circuit 540 can use any known or later developed window to perform this observation. It should be recognized that a single window may be used to observe all of the respective color planes. Alternatively, different windows may be used to observe each color plane.

The vector determining circuit 540 first analyzes the neighborhood 652 in the cyan color plane to determine a pixel value for the target pixel 654 in the cyan color plane 610. Based on this observation, the vector determining circuit 540 generates a vector $c_1c_2 \ldots c_9$. The vector $c_1c_2 \ldots c_9$ represents the observed pixel values $c_1$–$c_9$ in the cyan color plane 610 for the target pixel 654. Then, the vector determining circuit 540 observes the same neighborhood, but in the magenta color plane 620.

Specifically, the vector determining circuit 540 analyzes the neighborhood 652 in the magenta color plane to determine a pixel value for the target pixel 654 in the magenta color plane 620. Based on this observation, the vector determining circuit 540 generates a vector $m_1m_2 \ldots m_9$. The vector $m_1m_2 \ldots m_9$ represents the observed pixel values $m_1$–$m_9$ in the magenta color plane 620 for the target pixel 654. Then, the vector determining circuit 540 observes the same neighborhood, but in the yellow color plane 630.

Specifically, the vector determining circuit 540 analyzes the neighborhood 652 in the yellow color plane to determine a pixel value for the target pixel 654 in the yellow color plane 630. Based on this observation, the vector determining circuit 540 generates a vector $y_1y_2 \ldots y_9$. The vector $y_1y_2 \ldots y_9$ represents the observed pixel values $y_1y_9$ in the yellow color plane 630 for the target pixel 654.

Accordingly, the cyan, magenta and yellow color planes 610–630 are analyzed and single-plane vectors are generated for each respective color plane. The vector determining circuit 540 then combines these single-vectors to form a multi-plane vector $c_1c_2 \ldots c_9 \, m_1m_2 \ldots m_9y_2 \ldots y_9$. This multi-plane vector represents the three binary image planes 610, 620 and 630 in the image 600.

Then, the controller 510 controls the look-up table extracting circuit 550 to process the multi-plane vector. Specifically, the look-up table extracting circuit 550 inputs the multi-plane vector into the look-up table stored in the look-up table memory 532. Then, the look-up table extracting circuit 550 extracts a grayscale value that corresponds to the input multi-plane vector. The look-up table extracting circuit 550 assigns this grayscale value to the target pixel 654. The output grayscale value is optimized in accordance with the systems and methods of the invention to depend not only on purely the respective color plane image information, but also on the interrelationship between the color planes.

In accordance with the systems and methods of the invention, the look-up table stored in the look-up table memory 532 may be created using the systems and methods as described above with respect to FIGS. 1–4, for example, including the use of training images and methods to limit the size of the look-up table. That is, an appropriate set of training images including a binary training image and a corresponding grayscale training image is used. These training images may be selected based on expert knowledge, for example.

The look-up table in the look-up table memory 532 includes a template set that can effectively map an input colored binary image to a corresponding grayscale image. Further, in accordance with the systems and methods of the invention, the look-up table can perform this mapping in a very effective manner. The vector that is input into the look-up table possesses information from all the color planes in an image. Thus, the look-up table can be designed to generate an output that effectively deals with certain interrelationships between the different color planes in an image. That is, the entries of the look-up table are designed to effectively avoid image degradations that might otherwise occur if the color planes were treated separately.

However, it should be recognized that the systems and methods of the invention are not limited to descreening a halftone image to a grayscale image. Rather, the systems and methods of the invention are applicable to process a wide variety of images in a wide variety of manners.

Further, it should be understood that while the systems and methods of this invention are directed to color images, "color image" is intended to encompasses a wide variety of images and is in no way limited to the common CMYK image. Rather, the term color image is intended to encompass any image that is represented by at least two independent vectors. Accordingly, a black and white image may, in this respect, be represented by two vectors and be characterized as a color image. Specifically, the black portion can be represented by one vector $b_1-b_n$ and the white portion can be represented by another vector $w_1-w_n$. In accordance with the systems and methods of the invention, these two vectors would be combined into a multi-plane vector $b_1-b_n$, $w_1-w_n$. By independently representing the black and white portion using separate vectors the attributes of the image may be effectively captured. Further, by using the multi-plane vector $b_1-b_n$, $w_1-w_n$, the interrelationships between the black and the white portions can be effectively processed to avoid image degradations.

Figure 10:
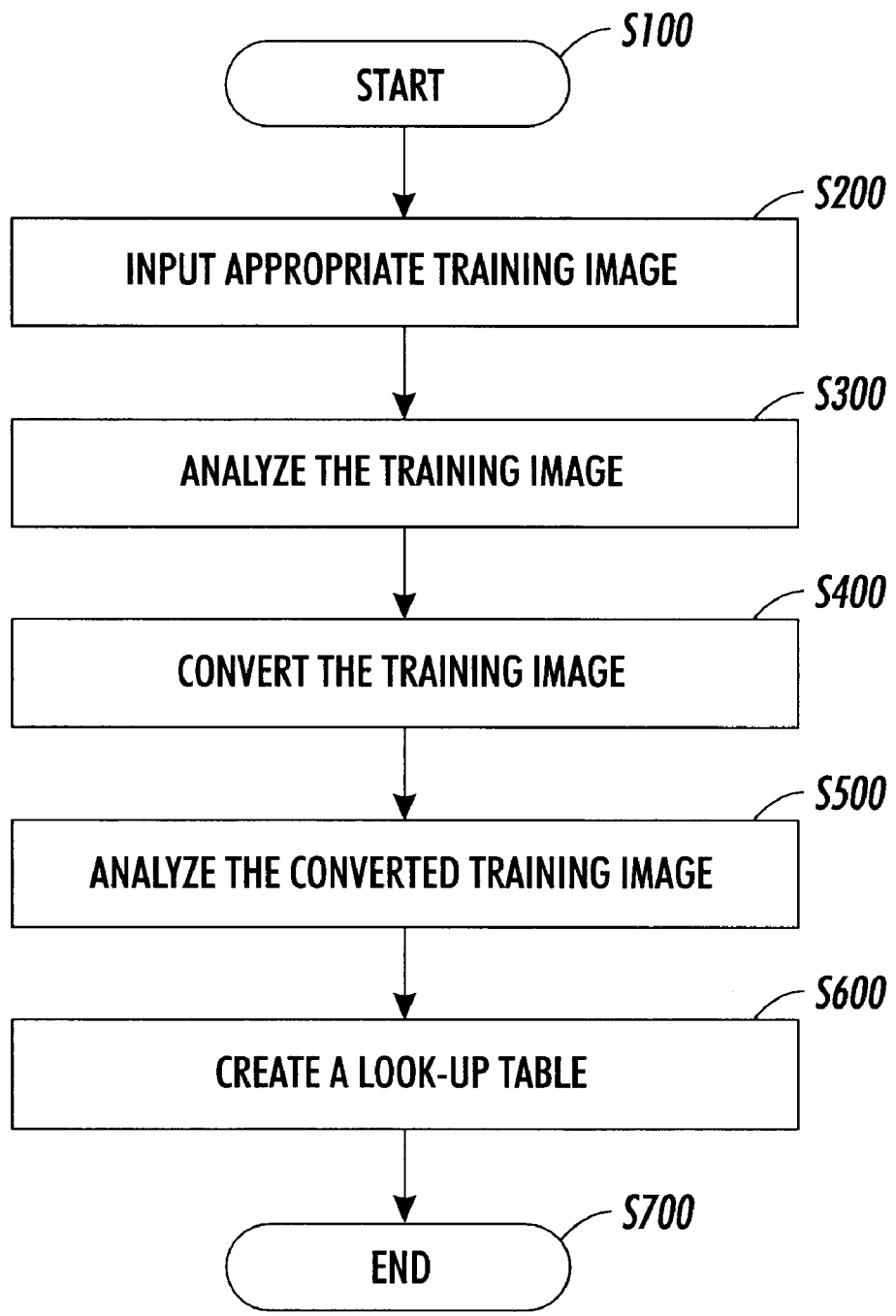
FIG. 10 is a flowchart outlining one exemplary embodiment of an image analysis method in accordance with this invention.

FIG. 10 is a flowchart outlining one exemplary embodiment of a training method according to this invention. As shown in FIG. 10, the training process begins in step S100, and continues to step S200, where an appropriate training image is input. The training image may be any suitable image depending on the particular application. Illustratively, the training image may be a multi-color multi-plane binary image. Next, in step S300, the training image is analyzed.

In step S400, the training image is converted in some manner using a suitable conversion process. For example, it may be necessary or desired to perform resolution enhancement. As a result, the conversion process could be a decomposition process, i.e., an inverse resolution enhancement process. Then, in step S500, the converted training image is analyzed. Next, in step S600, a look-up table is created. Then, in step S700, the training method ends.

Figure 11:
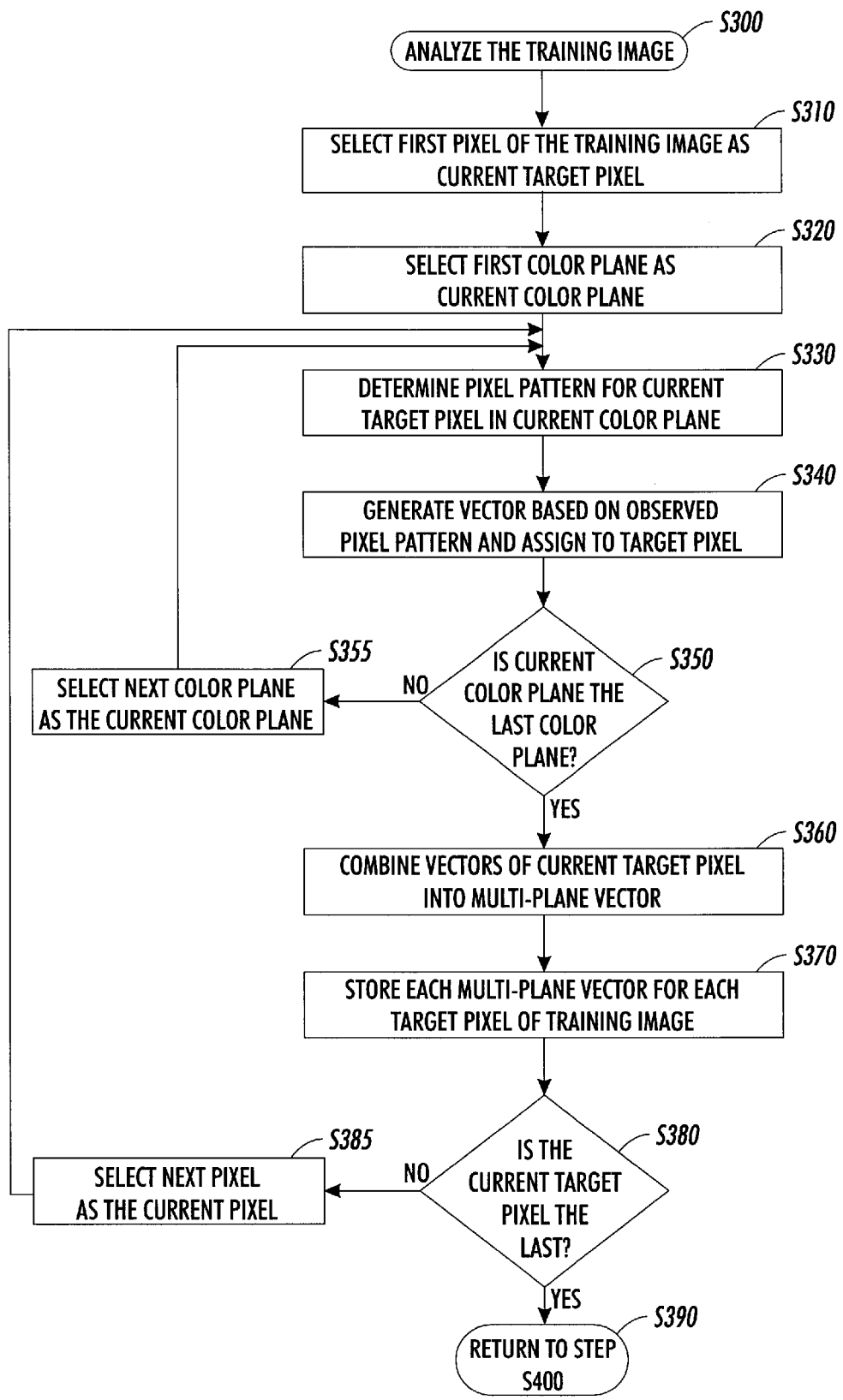
FIG. 11 is a flowchart outlining in greater detail one exemplary embodiment of the training image analysis step of FIG. 10.

FIG. 11 is a flowchart outlining in greater detail one exemplary embodiment of analyzing the training image in step S300 of FIG. 10. Beginning in step S300, control continues to step S310, where the first pixel of the training image is selected as the current target pixel. Then, in step S320, the first color plane in the training image is selected as the current color plane. Next, in step S330, the pixel pattern is determined for the current target pixel in the current color plane. Control then continues to step S340.

In step S340, a vector is generated based on the observed pixel pattern and the vector is assigned to the current target pixel. The vector generated in step S340 is a single plane vector representing the observed pixel pattern. Next, in step S350, the current plane is analyzed to determine if the current plane is the last color plane for the particular target pixel being analyzed.

If, in step S350, the current color plane is not the last color plane for analysis of the current target pixel, control continues to step S355. Otherwise, control jumps to step S360. In step S355, the next color plane of the image for the current target pixel is selected as the current plane. Control then returns to step S330.

Once the current color plane is the last color plane in step S350, control jumps to step S360. In step S360, all the vectors for the current target pixel are combined into a multi-plane vector. Then, in step S370, each multi-plane vector is stored for the current target pixel. Storing each multi-plane vector may be accomplished in any suitable manner. Then, in step S380, the current target pixel is analyzed to determine if it is the last target pixel.

If, in step S380, the current target pixel is not the last target pixel for analysis of the training image, control continues to step S385. Otherwise, control jumps to step S390. In step S385, the next target pixel is selected as the current pixel. Control then returns to step S330.

Once the current target pixel is the last target pixel in step S380, control jumps to step S390. In step S390, control returns to step S400.

Figure 12:
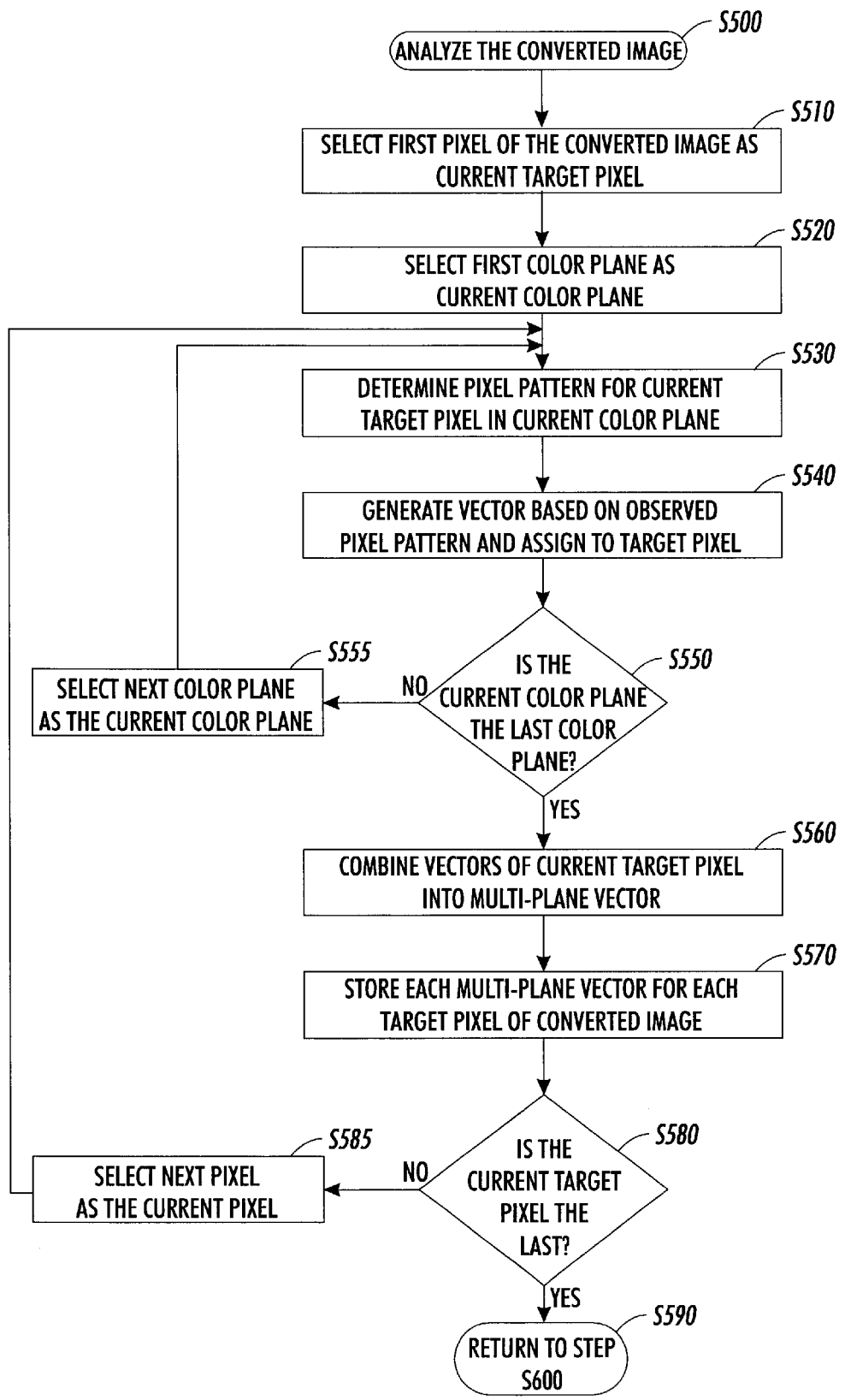
FIG. 12 is a flowchart outlining in greater detail one exemplary embodiment of the converted image analysis step of FIG. 10.

FIG. 12 is a flowchart outlining in greater detail one exemplary embodiment of analyzing the converted image in step S500 of FIG. 10. Beginning in step S500, control continues to step S510, where the first pixel of the converted image is selected as the current target pixel. Then, in step S520, the first color plane in the converted image is selected as the current color plane. Next, in step S530, the pixel pattern is determined for the current target pixel in the current color plane of the converted image. Control then continues to step S540.

In step S540, a vector is generated based on the observed pixel pattern and the vector is assigned to the current target pixel. The vector generated in step S540 is a single plane vector representing the observed pixel pattern in one color plane of the converted image. Next, in step S550, the current color plane is analyzed to determine if the current plane is the last color plane for the particular target pixel being analyzed.

If, in step S550, the current color plane is not the last color plane for analysis for the current target pixel, control continues to step S555. Otherwise, control jumps to step S560. In step S555 the next color plane of the image is selected as the current plane. Control then returns to step S530.

Once the current color plane is the last color plane in step S550, control jumps to step S560. In step S560, all the vectors for the current target pixel in the converted image are combined into a multi-plane vector. Then, in step S570, each multi-plane vector is stored for the current target pixel. Storing each multi-plane vector may be accomplished in any suitable manner. Then, in step S580, the current target pixel is analyzed to determine if it is the last target pixel.

If, in step S580, the current target pixel is not the last target pixel for analysis for the converted image, control continues to step S585. Otherwise, control jumps to step S590. In step S585, the next target pixel is selected as the current target pixel. Control then returns to step S530.

Once the current target pixel is the last target pixel in step S580, control jumps to step S590. In step S590, control returns to step S600.

Figure 13:
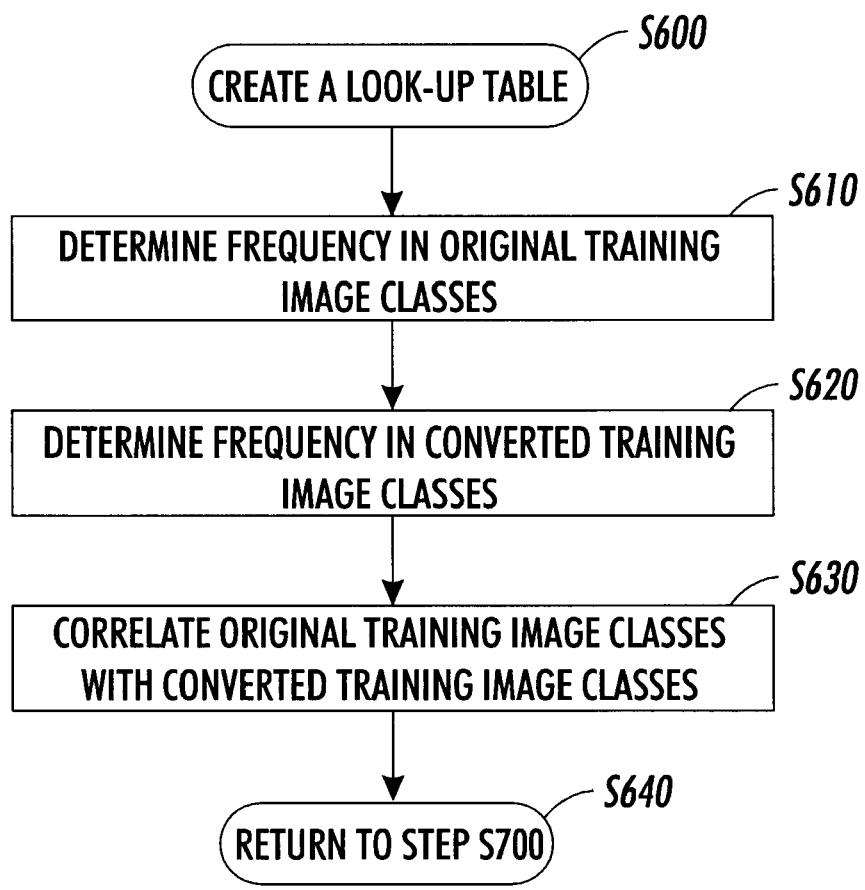
FIG. 13 is a flowchart outlining one exemplary embodiment of a method for creating a look-up table of FIG. 10 in accordance with this invention.

FIG. 13 is a flowchart outlining in greater detail one exemplary embodiment of creating a look-up table of step S600 of FIG. 10. Beginning in step S600, control continues to step S610, where the frequency in the original training image classes is determined. The "original training image" refers to the image that was initially input in step S200 in FIG. 10. Then, in step S620, the frequency in the converted training image classes is determined. Next, in step S630, the original training image classes are correlated with the converted training image classes. Then, in step S640, control returns to step S700.

Figure 14:
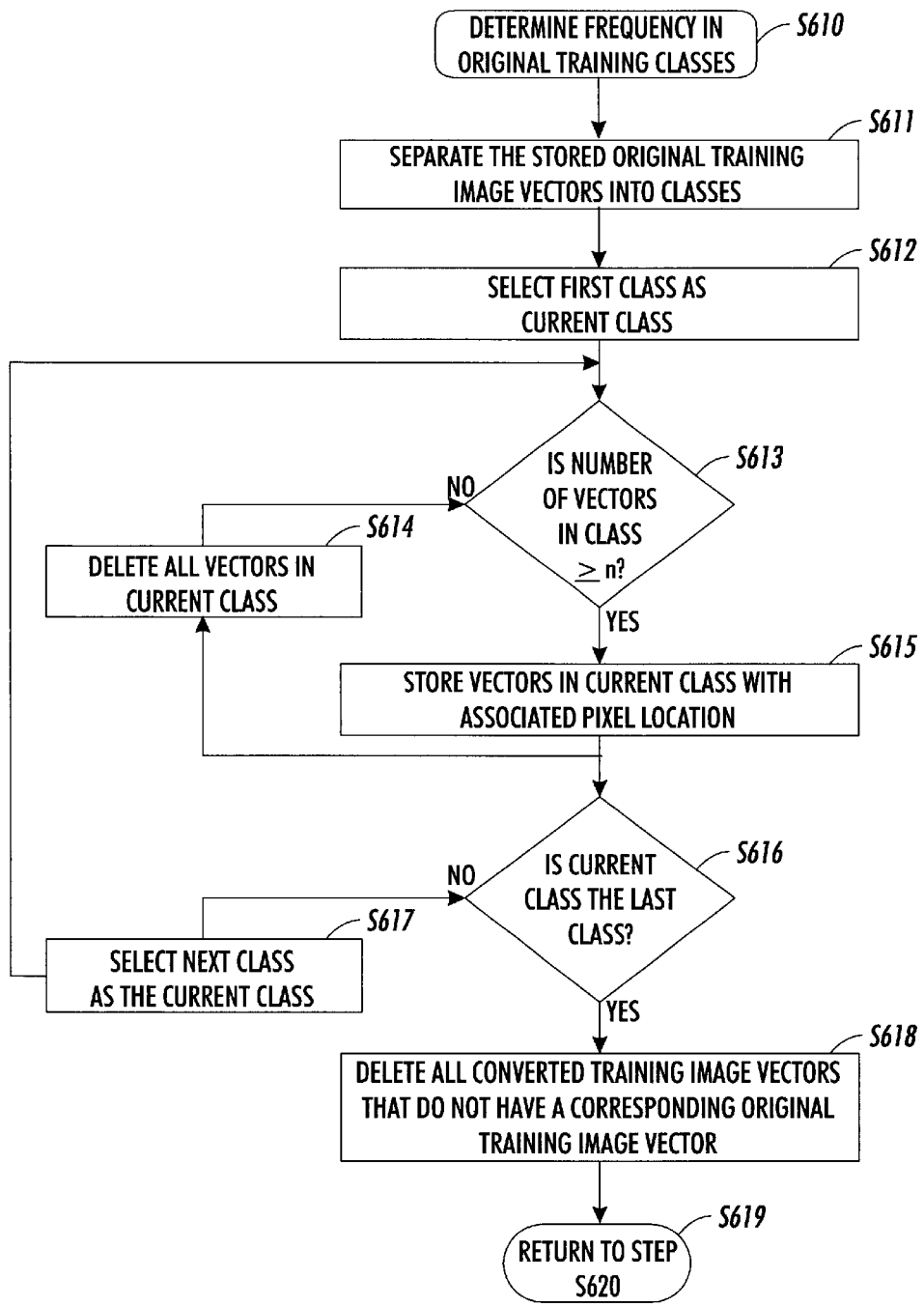
FIG. 14 is a flowchart outlining in greater detail one exemplary embodiment of the determining the frequency in the original training image step of FIG. 13.

FIG. 14 is a flowchart outlining in greater detail one exemplary embodiment of determining the frequency in the original training image classes of step S600 of FIG. 13. As described above, in step S380 of FIG. 11, each multi-plane vector for each training image was stored. As outlined in FIG. 14, these stored multi-plane vectors for the original training image are further analyzed.

Beginning in step S610, control continues to step S611, where the stored training image vectors, i.e., the original training image vectors, are separated into classes. The specific parameters on which the class divisions are based depends on the particular application. Then, in step S612, the first class of original training image vectors is selected as the current class. Next, in step S613, a determination is made whether the number of vectors in the current class is less than a threshold value "n." If, in step S613, the number of vectors in the class is less than the threshold value n, control continues to step S614. Otherwise, control jumps to step S615.

In step S614, all the vectors in the current class are discarded, i.e., the class is discarded. It should be recognized that as the value of n decreases, the number of vectors in the current class that is needed to retain the current class decreases. As a result, more classes are retained. By retaining more classes, the ultimate size of the look-up table is larger. This, of course, would require more storage capacity. Accordingly, the value of n directly results the size of the look-up table generated by the training process.

After step S614, control then passes to step S616. In step S615, all the vectors in the current class are stored. Control then continues to step S616.

In step S616, the current class is analyzed to determine if the current class is the last class of the original training image classes. If, in step S616, the current class is not the last class, control continues to step S617. Otherwise, control jumps to step S618. In step S617, the next class of the original training image classes is selected as the current class. Control then returns to step S613. In contrast, in step S618, all the converted training image vectors that no longer have corresponding original training image vectors are deleted. Then, in step S619, control returns to step S620.

Figure 15:
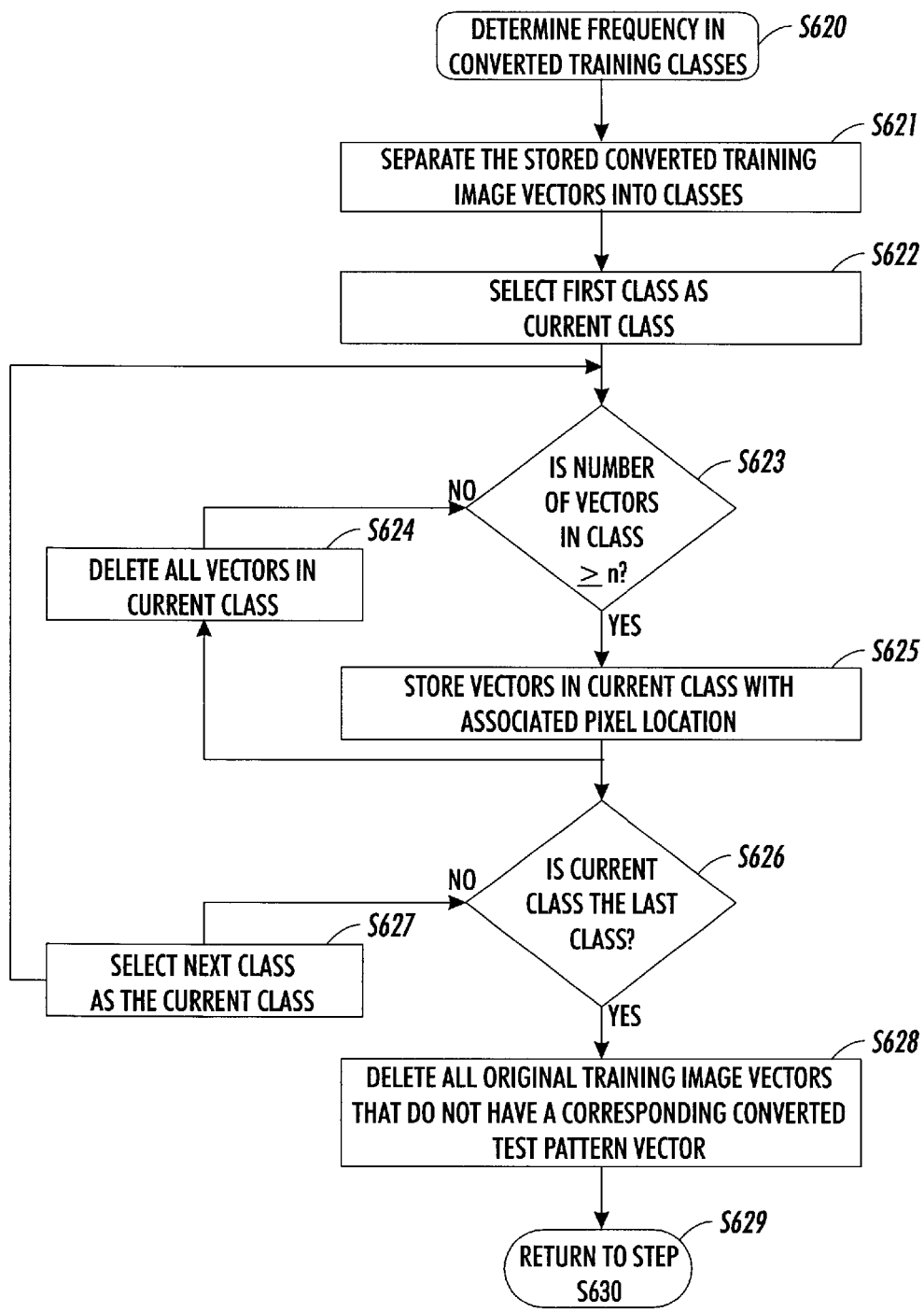
FIG. 15 is a flowchart outlining in greater detail one exemplary embodiment of the determining the frequency in the converted training image step of FIG. 13.

FIG. 15 is a flowchart outlining in greater detail one exemplary embodiment of determining the frequency in the converted training image classes of step S620.

Beginning in step S620, control continues to step S621, where the stored converted image vectors, are separated into classes. The specific parameters on which the class divisions are based depends on the particular application. Then, in step S622, the first class of converted image vectors is selected as the current class. Next, in step S623, a determination is made whether the number of vectors in the current class of converted image vectors is less than a threshold value, m. If, in step S623, the number of vectors in the class is less than the threshold value n, control continues to step S624. Otherwise, control jumps to step S625.

In step S624, all the vectors in the current class are discarded. It should be recognized that as the value of m decreases, the number of vectors in the current class that is needed to retain the current class decreases. As a result, more classes of the converted image are retained. By retaining more classes, the ultimate size of the look-up table is larger. Accordingly, the value of m directly results the size of the look-up table generated by the training process.

After step S624, control then jumps to step S626. In step S625, all the vectors in the current class are stored. Control then continues to step S616.

In step S626, the current class is analyzed to determine if the current class is the last class of the converted image classes. If, in step S626, the current class is not the last class, control continues to step S627. Otherwise, control jumps to step S628. In step S627, the next class of the converted image vector classes is selected as the current class. Control then returns to step S623. In contrast, in step S628, all the original training image vectors that no longer have corresponding converted image vectors are deleted. Then in step S629, controls returns to step S620.

Figure 16:
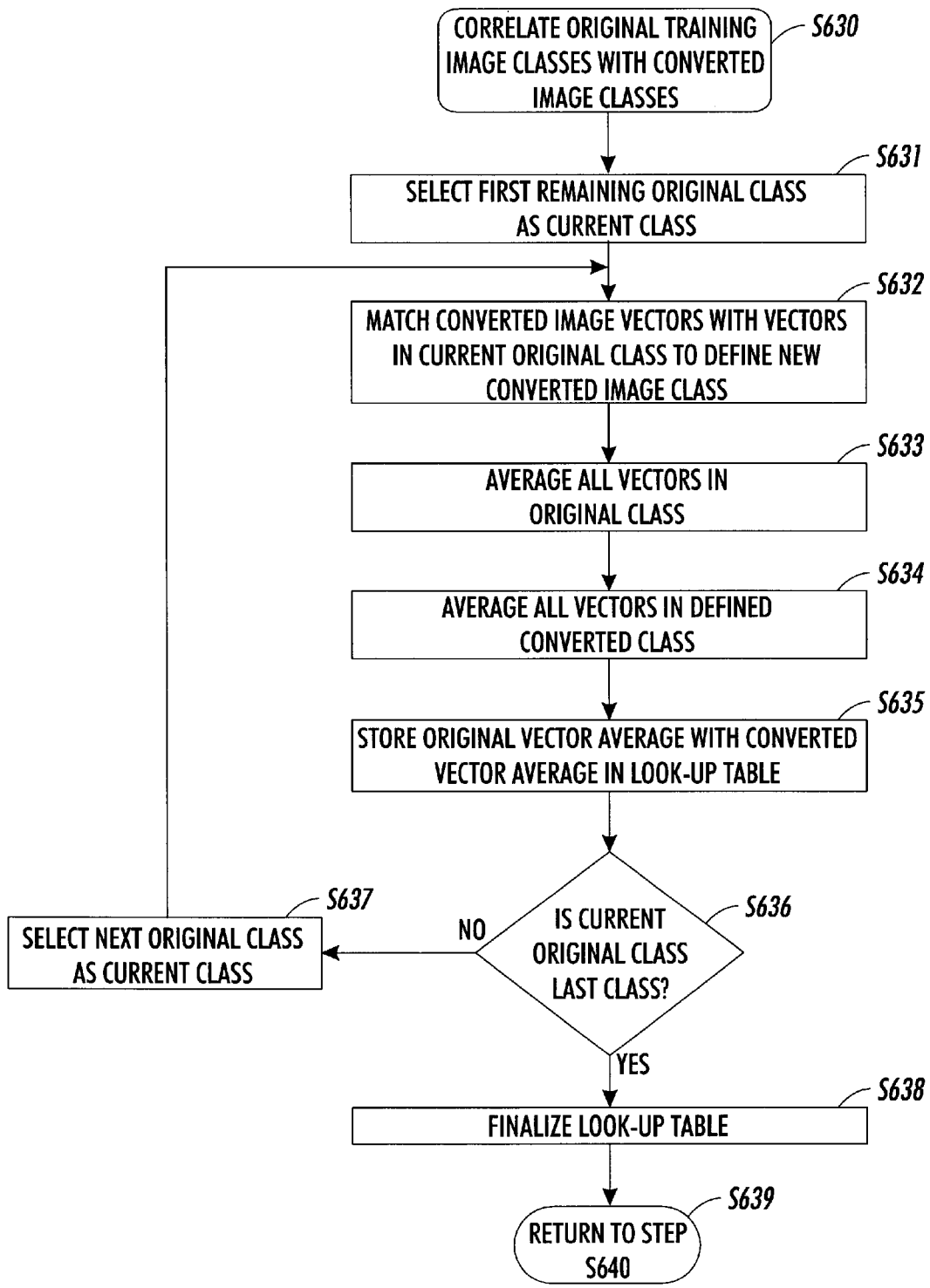
FIG. 16 is a flowchart outlining in greater detail one exemplary embodiment of the correlating the original training image classes with the converted image classes step of FIG. 13.

FIG. 16 is a flowchart outlining in greater detail one exemplary embodiment of correlating the original image classes with the converted image classes of step S630 of FIG. 13. Beginning in step S630, control continues to step S631, where the first original image class is selected as the current class. Then, in step S632, the vectors in the current original image class are each matched with corresponding converted image vectors based on pixel location. Next, in step S633, all the vectors in each of the respective original image classes are averaged. Control then continues to step S634.

In step S634, all the vectors in each of the respective converted image classes are averaged. Then, in step S635, the original image vector average is stored with the corresponding converted image vector average in an appropriate look-up table. Next, in step S636, a determination is made whether the current original image class is the last class.

If, in step S636, the current original image class is not the last class, control continues to step S637. Otherwise, control jumps to step S638. In step S637, the next original image lass is selected as the current class. Control then returns to step S632. In contrast, in step S638, the look-up table is stored in some suitable memory. Then in step S639, control returns to step S640.

Figure 17:
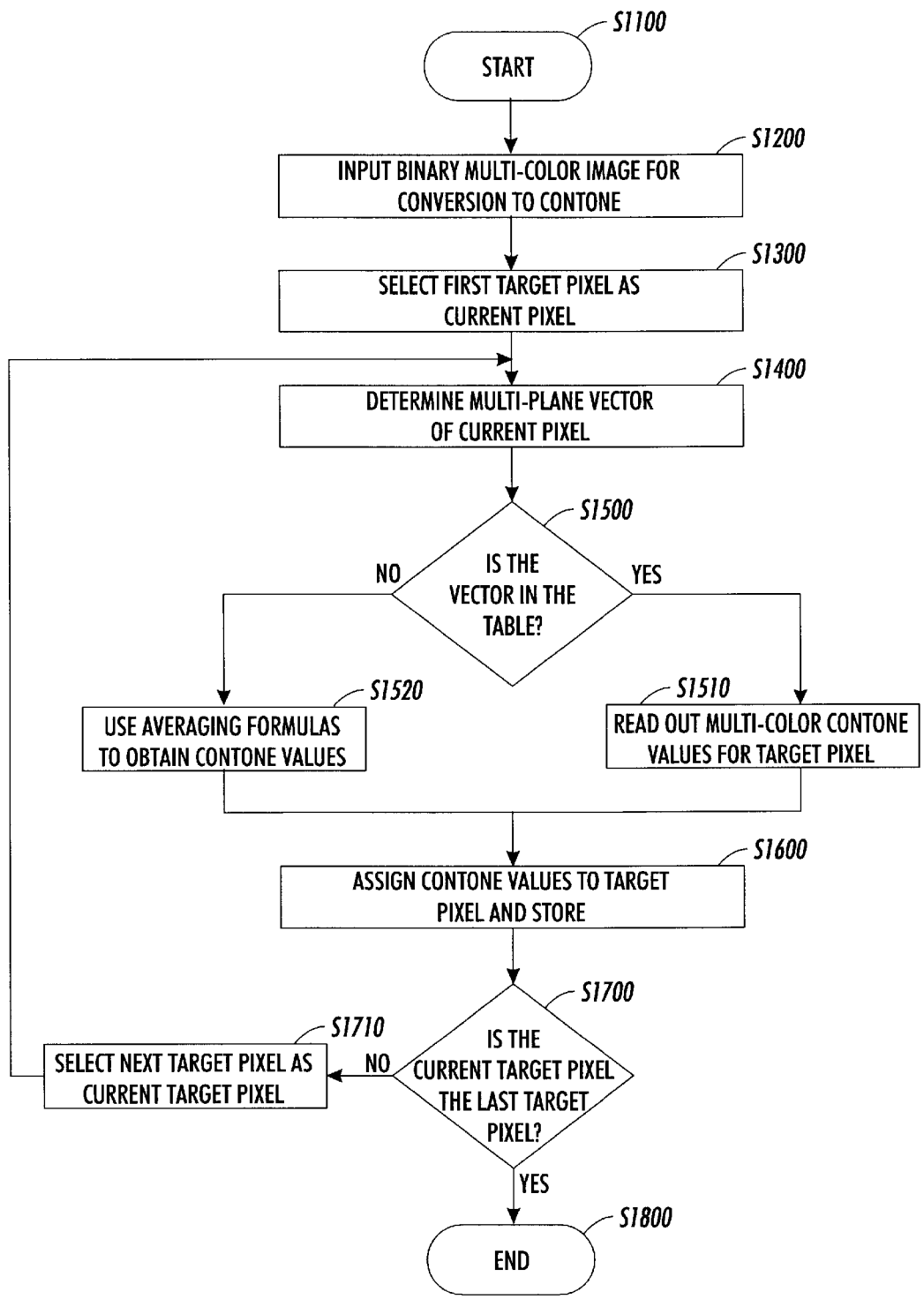
FIG. 17 is a flowchart outlining one exemplary embodiment of a method for processing a multi-plane color image using a multicolor look-up table according to this invention.

FIG. 17 is a flowchart outlining one exemplary embodiment of the systems and methods for multi-plane template matching in accordance with the invention using a look-up table. The flowchart of FIG. 17 illustrates using a look-up table to convert a color multi-plane binary image to a corresponding contone image.

Beginning in step S1100, control continues to step S1200, where the binary multi-plane color image is input for conversion to a contone image. Then, in step S1300, the first target pixel of the input image is selected as the current target pixel. Next, in step S1400, the current pixel is analyzed to determine a multi-pan vector that represents the current pixel. Control then continues to step S1500.

In step S1500, the vector generated in step S1400 is used as an input into an appropriate look-up table. Specifically, in step S1500, a determination is made whether the vector that represents the current target pixel is in the look-up table. If the vector is in the look-up table, control continues to step S1510. Otherwise, control jumps to step S1520.

In step S1510, the multi-plane contone values for the target pixel are read out. Then, control jumps to step S1600. In contrast, in step S1520, a contone image that represents the target pixel is obtained by using conventional averaging techniques. Control then continues to step S1600.

In step S1600, the contone values, generated in either step S1510 or step S1520, are assigned to the current target pixel and stored. Then, in step S1700, the current target pixel is analyzed to determine if it is the last target pixel in the binary image.

If, in step S1700, the current target pixel is not the last target pixel for analysis of the binary image, control continues to step S1710. Otherwise, control jumps to step S1800. In step S1710, the next target pixel is selected as the current target pixel. Control then returns to step S1400. Once the current target pixel is the last target pixel in step S1700, control jumps to step S1800. In step S1800, the conversion of the binary image ends.

The template matching systems 200 and 500 shown in FIGS. 1–4 and FIG. 8, receptively, are each preferably implemented on a programmed general purpose computer. However, each of the template matching systems 200 and the template matching system 500 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 10–17, can be used to implement the template matching systems 200 and 500.

In particular, it should be understood that each of the circuits shown in FIGS. 1–4 and 8 can be implemented as portions of a suitably programmed general purpose computer. Alternatively, each of the circuits shown in FIGS. 1–4 and 8 can be implemented as physically distinct hardware circuits within an ASIC, or using a FPGA, a PDL, a PLA or a PAL, or using discrete logic elements or discrete circuit elements. The particular form each of the circuits shown in FIGS. 1–4 and 8 will take is a design choice and will be obvious and predicable to those skilled in the art.

Each of the memorys 280 and 530 is preferably implemented using static or dynamic RAM. However, the memorys 280 and 530 can also be implemented using a floppy disk and disk drive, a writable optical disk and disk drive, a hard drive, flash memory or any other known or later developed alterable volatile or non-volatile memory device or system.

While this invention has been described in conjunction with specific embodiments outlined above, it is evident that many alternative modifications and variations may be apparent to those skilled in the art. Accordingly, the exemplary embodiments of the invention as set forth herein are intended to be illustrative, not limiting. Various changes may be made without departing from the spirit and scope of the invention.

What is claimed is:

1. A method for converting an observed image into an ideal image, the observed image having at least two color planes, each color plane having a plurality of pixels arranged in a two-dimensional array, the method comprising:

selecting at least one of the plurality of pixels in the observed image;

determining, for each selected pixel, a pixel parameter value for a single color plane in each of the at least two color planes of the observed image;

combining, for each selected pixel in the observed image, the pixel parameter values into a multi-plane pixel parameter value;

associating each of the multi-plane pixel parameter values with a corresponding ideal image pixel parameter value; and generating the ideal image based on the ideal image pixel parameter values.

2. The method according to claim 1, wherein the determining, for each selected pixel, of the pixel parameter value in each of the at least two color planes of the observed image comprises:

observing neighborhood image data for each selected target pixel in each of the at least two color planes;

generating each of the pixel parameter values for the single color planes based on the respective observed neighborhood image data.

3. The method according to claim 2, wherein the neighborhood includes a 3×3 array of pixels in the observed image.

4. The method according to claim 3, wherein the pixel parameter values for the single color planes are 9-element vectors.

5. The method according to claim 4, wherein the multi-plane pixel parameter value is at least an 18-element vector, the at least 18-element vector includes at least two 9-element vectors.

6. The method according to claim 1, wherein each of the pixel parameter values for the single color planes and each of the multi-plane pixel parameter values are vectors.

7. The method according to claim 1, wherein associating each of the multi-plane pixel parameter values with a corresponding ideal image pixel parameter value comprises, for each multi-plane pixel parameter value:

inputting the multi-plane pixel parameter value into a look-up table;

extracting a corresponding ideal image pixel parameter value if there is an entry in the look-up table that corresponds to the input multi-plane pixel parameter value; and processing the multi-plane pixel parameter value if there is not an entry in the look-up table that corresponds to the input multi-plane pixel parameter value.

8. The method according to claim 7, wherein processing the multi-plane pixel parameter value if there is not an entry in the look-up table includes using averaging techniques.

9. The method according to claim 1, wherein associating each of the multi-plane pixel parameter values with a corresponding ideal image pixel parameter value comprises, for each multi-plane pixel parameter value:

inputting the multi-plane pixel parameter value into a template system, the template system having a plurality of primary addresses and a plurality of secondary addresses for each of the primary addresses;

determining if the multi-plane pixel parameter value corresponds to one of the primary addresses based on image data information in the multi-plane pixel parameter value obtained from a first color plane in the observed image;

determining if the multi-plane pixel parameter value corresponds to one of the secondary addresses of the determined primary address based on image data information in the multi-plane pixel parameter value obtained from a second color plane in the observed image; and extracting a corresponding ideal image pixel parameter value from the template system based on the primary and secondary addresses.

10. The method according to claim 9, wherein:

the template system has a plurality of tertiary addresses for each of the secondary addresses; and associating each of the multi-plane pixel parameter values with a corresponding ideal image pixel parameter value, for each multi-plane pixel parameter value, fuirther comprises:

determining if the multi-plane pixel parameter value corresponds to one of a plurality of the tertiary addresses of the determined secondary address based on image data information in the multi-plane pixel parameter value obtained from a third color plane in the observed image; and extracting a corresponding ideal image pixel parameter value from the template system based on the tertiary address.

11. The method according to claim 10, wherein the template system is at least one of a look-up table and a Boolean logic circuit.

12. The method according to claim 9, wherein the first color plane is a black color plane in the observed image.

13. The method according to claim 1, wherein associating each of the multi-plane pixel parameter values with a corresponding ideal image pixel parameter value is performed using a look-up table.

14. The method according to claim 1, wherein associating each of the multi-plane pixel parameter values with a corresponding ideal image pixel parameter value is performed using a Boolean logic circuit.

15. The method according to claim 1, wherein the observed image is at least one of a binary image and a grayscale image and the ideal image is at least one of a grayscale image and a binary image.

16. The method according to claim 1, wherein the observed image includes four color planes and the ideal image is a grayscale image, the multi-plane pixel parameter value including image information for each of the four color planes.

17. The method according to claim 1, wherein the observed image includes two color planes.

18. The method according to claim 17, wherein the observed image includes a black color plane and a white color plane.

19. The method according to claim 1, wherein the observed image includes a cyan color plane, a magenta color plane, a yellow color plane and a black color plane.

20. The method according to claim 1, wherein the ideal image includes a cyan color plane, a magenta color plane, a yellow color plane and a black color plane.

21. A method for generating a template system suitable for converting an observed image into an ideal image, the observed image having at least two color planes, each color plane having a plurality of pixels arranged in a two-dimensional array, the method comprising:

selecting at least one of the plurality of pixels in the observed image;

determining, for each selected pixel, a pixel parameter value for a single color plane in each of the at least two color planes of the observed image;

combining, for each selected pixel in the observed image, the pixel parameter values into a multi-plane pixel parameter value;

associating each of the multi-plane pixel parameter values with a corresponding ideal image pixel parameter value in the ideal image; and generating the template system based on associated multi-plane pixel parameter values and ideal image pixel parameter values.

22. The method of claim 21, wherein the determining, for each selected pixel, of the pixel parameter value in each of the at least two color planes of the observed image comprises:

selecting a color plane in the observed image as a selected color plane;

observing image information for the selected pixel in the selected color plane;

generating the pixel parameter value for the single color plane based on the observed image information;

assigning the pixel parameter value to the selected pixel; and repeating the observing, generating and assigning steps until the selected color plane is the last color plane of the at least two color planes in the observed image.

23. The method according to claim 22, wherein the template system is at least one of a look-up table and a Boolean operator.

24. The method according to claim 22, wherein observing image information for the selected pixel in the selected color plane comprises observing a neighborhood of pixels.

25. The method according to claim 24, wherein the neighborhood includes a 3×3 array of pixels in the observed image.

26. The method according to claim 25, wherein each pixel parameter values for the single color planes are 9-element vectors.

27. The method according to claim 26, wherein each multi-plane pixel parameter value is at least an 18-element vector, the at least 18-element vector includes at least two 9-element vectors.

28. The method according to claim 21, wherein each of the pixel parameter values and each of the multi-plane pixel parameter values are vectors.

29. The method according to claim 21, wherein the observed image is at least one of a binary image and a grayscale image and the ideal image is at least one of a grayscale image and a binary image.

30. The method according to claim 21, wherein generating the template system based on associated multi-plane pixel parameter values and ideal image pixel parameter values comprises:

determining a frequency of occurrence in at least one of the multi-plane pixel parameter values and the ideal image pixel parameter values; and including the associated multi-plane pixel parameter values and ideal image pixel parameter values in the template system only if the frequency is greater than a predetermined threshold value.

31. An template matching system that converts an observed image to an ideal image, at least one of the observed image and the ideal image having at least two color planes, the template matching system comprising:

a template system;

a vector determining circuit that determines a pixel parameter value for a single color plane in each of the at least two color planes of the observed image and that combines, for each selected pixel in the observed image, the pixel parameter values into a multi-plane pixel parameter value; and a template system value extractor that inputs the multi-plane pixel parameter value into the template system and outputs an ideal image pixel parameter value.

32. The template matching system of claim 31, wherein the template system is one of a look-up table and a Boolean logic circuit.

33. A printer comprising the template matching system of claim 31.

34. A personal computer comprising the template matching system of claim 31.

35. A facsimile machine comprising the template matching system of claim 31.

* * * * *